Jan. 6, 1959    C. O. PARKS    2,867,690
AUXILIARY SENDER CIRCUIT
Filed July 13, 1956    16 Sheets-Sheet 5

INVENTOR
C. O. PARKS
BY
C. Mattice
ATTORNEY

Jan. 6, 1959  C. O. PARKS  2,867,690
AUXILIARY SENDER CIRCUIT
Filed July 13, 1956  16 Sheets-Sheet 7

INVENTOR
C. O. PARKS
BY
C. Mathice
ATTORNEY

Jan. 6, 1959  C. O. PARKS  2,867,690
AUXILIARY SENDER CIRCUIT
Filed July 13, 1956  16 Sheets-Sheet 8

INVENTOR
C. O. PARKS
BY
C. Mattice
ATTORNEY

Jan. 6, 1959  C. O. PARKS  2,867,690
AUXILIARY SENDER CIRCUIT
Filed July 13, 1956  16 Sheets-Sheet 10

INVENTOR
C. O. PARKS
BY
C. Mattice
ATTORNEY

Jan. 6, 1959 C. O. PARKS 2,867,690
AUXILIARY SENDER CIRCUIT
Filed July 13, 1956 16 Sheets-Sheet 13

INVENTOR
C. O. PARKS
BY
C. Mathier
ATTORNEY

Jan. 6, 1959          C. O. PARKS          2,867,690

AUXILIARY SENDER CIRCUIT

Filed July 13, 1956          16 Sheets-Sheet 14

INVENTOR
C.O. PARKS
BY
C. Mathieu
ATTORNEY

Jan. 6, 1959   C. O. PARKS   2,867,690
AUXILIARY SENDER CIRCUIT
Filed July 13, 1956   16 Sheets-Sheet 15

INVENTOR
C. O. PARKS
BY
C. Mattice
ATTORNEY

United States Patent Office

2,867,690
Patented Jan. 6, 1959

2,867,690

AUXILIARY SENDER CIRCUIT

Charles O. Parks, East Norwalk, Conn., assignor to Bell Telephone Laboratories, Incorporated, New York, N. Y., a corporation of New York Application July 13, 1956, Serial No. 597,746

11 Claims. (Cl. 179—18)

This invention relates to telephone systems and has as its object to increase in scope the service provided by local dial telephone systems.

More particularly, the present invention provides means for readily modifying dial telephone offices, designed to establish only local calls, so that they can handle customer dialed toll calls, now generally termed direct distance dialing. As an auxiliary function, the present invention also provides means for giving such offices direct access to other local offices requiring the use of multi-frequency pulsing.

A typical local office is shown in United States Patent 2,235,803 granted to W. W. Carpenter March 18, 1941. In this type of office, when a subscriber originates a call, the calling line is automatically extended to an idle district junctor and to an idle subscriber sender. The subscriber sender receives and registers called line designations as dialed by the calling subscriber but is equipped to register a maximum of eight digits. In general, after the first three digits have been registered, identifying the office at which the call is located, the sender calls in an idle marker and passes these three digits to the marker. The marker translates these digits into a routing indication from which it derives information which it uses in selecting an idle trunk leading to the identified office and in connecting the selected trunk with the district junctor to which the calling line has been extended. At the same time, it derives information required by the sender such as class of the call, etc. which it passes back to the sender, followed by a release signal. From the class of call indication the sender determines the type of outpulsing to be used in controlling the called office, sets up the required type of control circuit passing by way of the district junctor and the selected outgoing trunk to the distant office and prepares the proper pulsing equipment. This control circuit, which is used both for testing the condition of the trunk and for transmitting the designation to the distant office, is usually called the "fundamental circuit."

In accordance with the present invention, an auxiliary sender is provided which is or is not inserted in the fundamental circuit in accordance with the designation of the called office.

A further feature of the invention relates to means for connecting the auxiliary sender with the subscriber sender either in accordance with the value of a particular digit or in accordance with a determination made by the marker from a translation of a plurality of digits.

According to an additional feature of the invention, the auxiliary sender is set by pulses transmitted in one code by the subscriber sender over a portion of the fundamental circuit and transmits the recorded designation to the distant office in accordance with a different code over a different portion of the fundamental circuit.

Furthermore, means is provided in the auxiliary sender to receive and register digits according to two codes together with means operated in accordance with the identity of the office to which the call is directed to determine whether one or both of said receiving means shall be used.

Means for generating the pulses of the different code is normally under the control of one of the said receiving means but is automatically controlled if said other receiving means is also used.

These and other features of the invention will be more clearly understood from a consideration of the following description read in connection with the attached drawings in which:

Fig. 3 shows a part of the control equipment of a subscriber sender;

Fig. 17 shows the manner in which Figs. 1 to 16 should be arranged.

Figure 1:
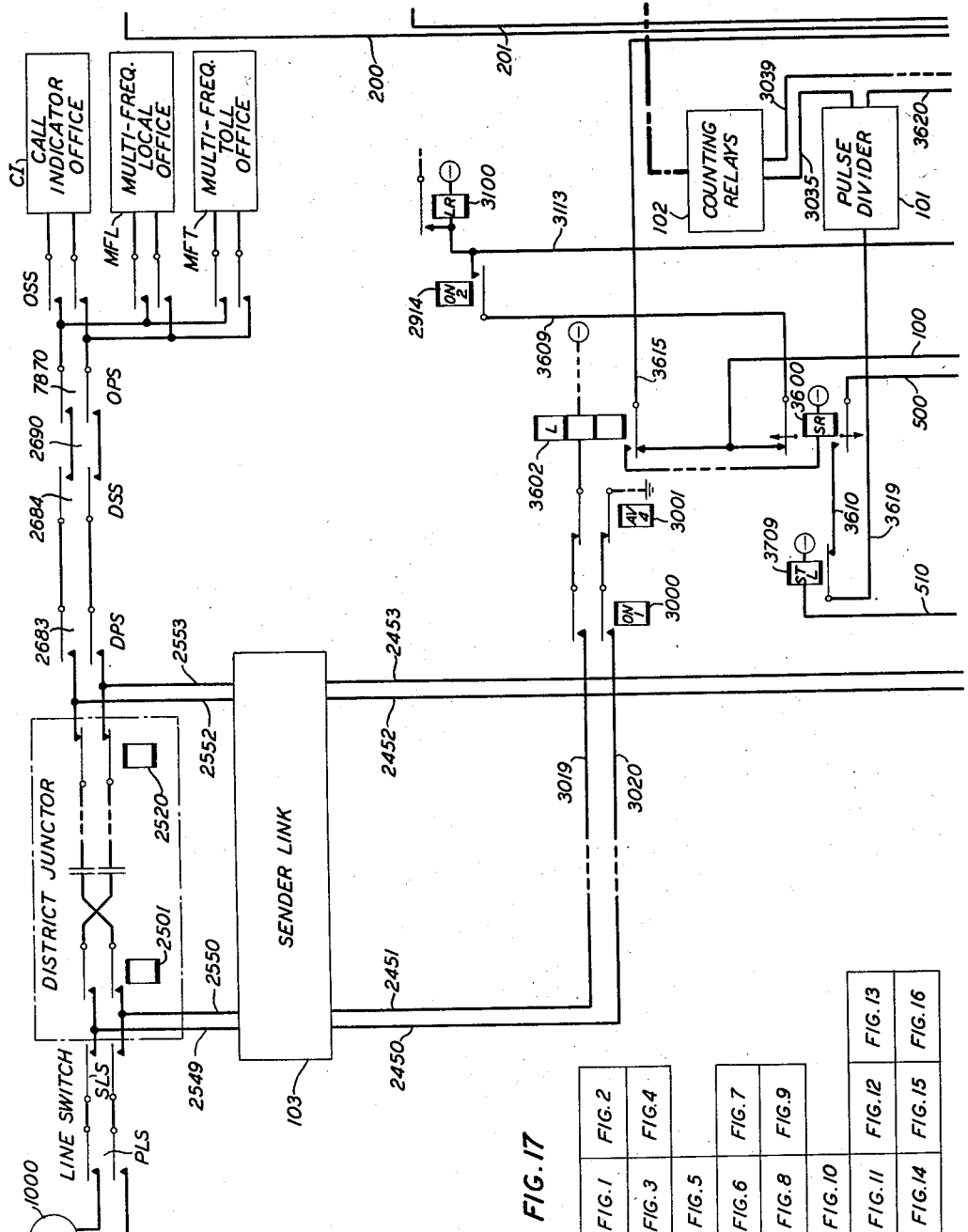
Fig. 1 shows portions of a district junctor and the pulse registering circuit of a subscriber sender together with three terminating offices.
Figure 2:
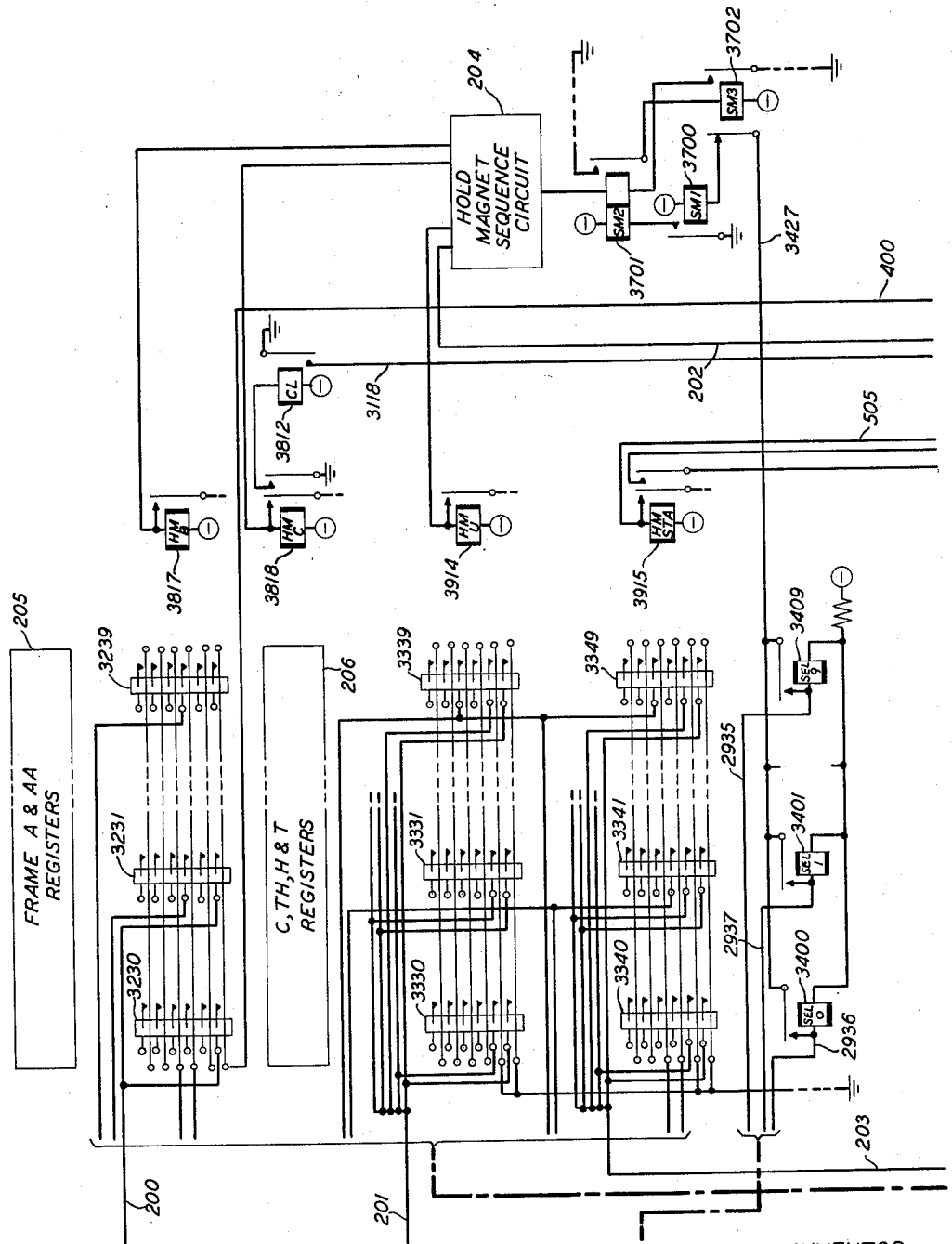
Fig. 2 shows a part of the crossbar register of a subscriber sender.
Figure 3:
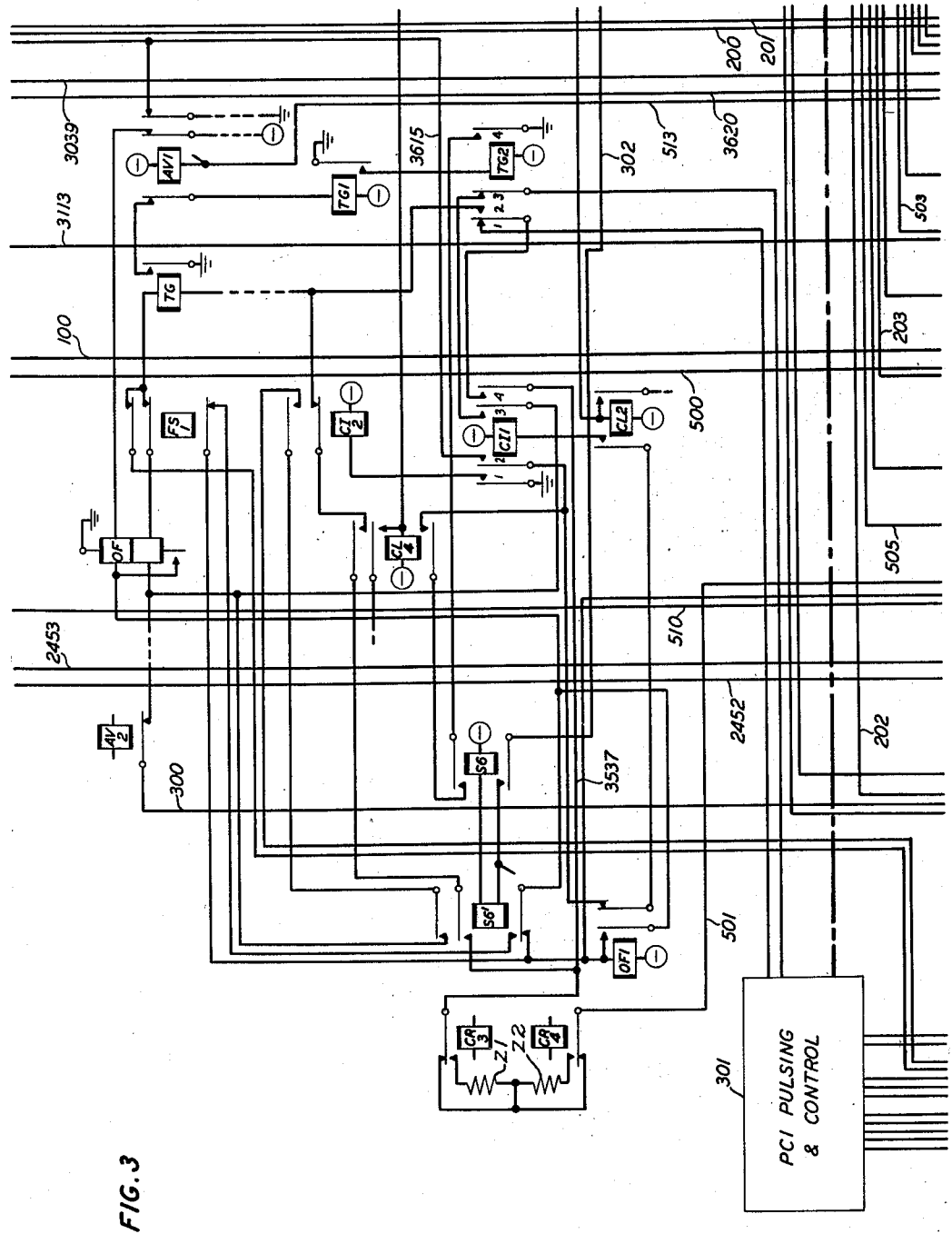
Fig. 3 shows a part of the crossbar register of a subscriber sender.
Figure 4:
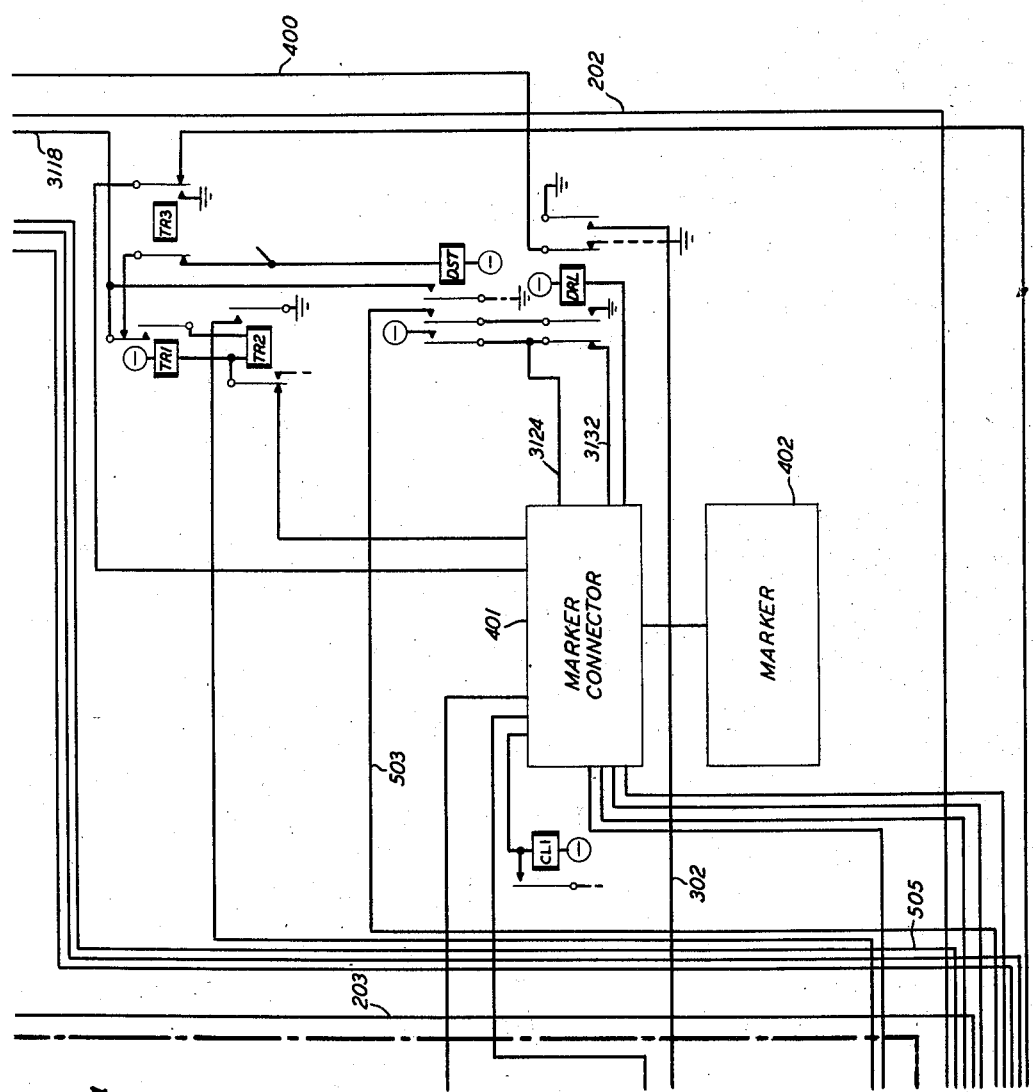
Fig. 4 shows in diagrammatic form a marker connector and a marker together with circuits by which the subscriber sender controls the marker connector.
Figure 5:
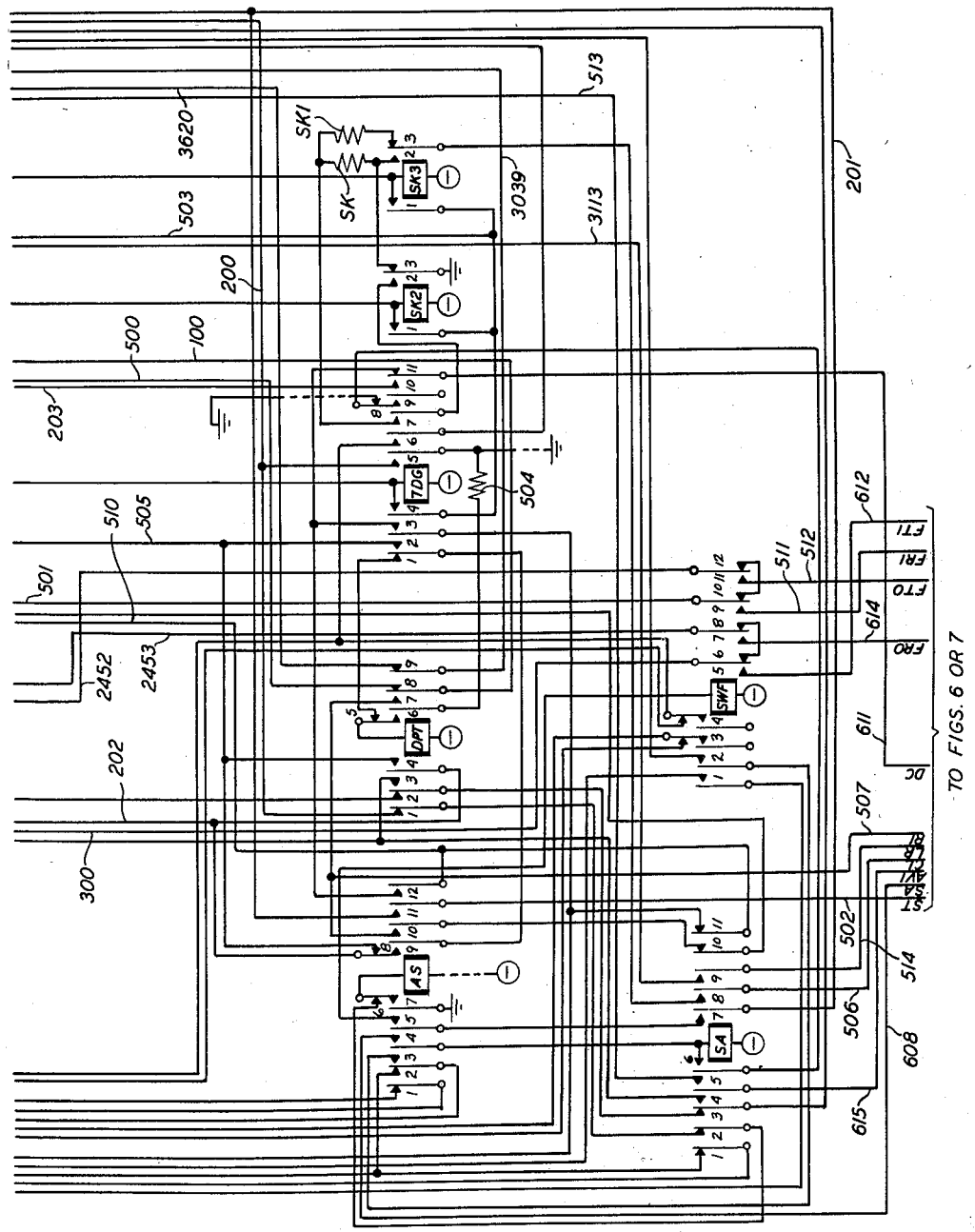
Fig. 5 shows that part of the subscriber sender which controls the connection with the auxiliary sender.

The circuits of Figs. 1 to 4 have been taken from the disclosure of Patent 2,235,803 granted to W. W. Carpenter March 18, 1941, and that patent is hereby incorporated by reference in the present disclosure. For convenience in consulting the Carpenter patent, although functional designations have been shown and will be employed in describing the operations in connection with the present invention, the numerical designations employed in the Carpenter patent have also been shown. Functional designation for relays, etc. will be employed in the present description, with an indication of the figure in which the apparatus appears given by appending to the functional designation the figure number enclosed in parentheses.

*Brief description*

When a call is originated at a subscriber's substation such as substation 1000, the line is extended over a primary line switch PLS(1) and a secondary line switch SLS(1) to an idle district junctor and through a sender link 103 to the pulsing relay L(1) of an idle subscriber sender. The subscriber sender includes a crossbar type register which has one hundred crosspoints arranged in ten vertical groups corresponding to the ten digits from 0 through 9 and ten horizontal levels. A crosspoint in the first level is operated to register the identity of the frame on which the district junctor is located. The first or A digit of the called line designation is shown as registered by operating corresponding crosspoints in the next two levels, to agree with the showing of the above-identified Carpenter patent. The B and C office code digits and the thousands, hundreds, tens, and units digits of the line number are registered on the fourth to ninth levels of the switch. If a five digit line number or a line number having a party line designation is dialed, the fifth digit or the party letter will be registered on the tenth level.

In registering the designation of a wanted subscriber, relay L(1) responds to the operation of the calling subscriber's dial, in turn operating the pulse divider 101 and the counting relays 102. At the end of each digit one of the select magnets SEL0(2) to SEL9(2), corresponding to the value of the digit dialed, is operated under the control of the counting relays 102 to prepare the corresponding vertical of the register switch. The operated select magnet causes a cycle of operation which results in the operation of one of the hold magnets HMA(2) to HMSTA(2) as determined by the hold magnet sequence circuit 204. With the hold magnet operated, the crosspoint determined by the operated select magnet is closed and held under the control of the hold magnet. The hold magnet sequence circuit 204 causes each digit to be registered by operating the indicated crosspoint at the proper level.

When the third or C digit has been registered, the marker connector 401 is operated to select an idle marker such as marker 402 and connect that marker with the sender. The first three digits, as well as the district frame identity, are transmitted to the marker, which translates these digits into two sets of routing information. One set of information is employed by the marker itself for selecting an idle trunk outgoing to the identified office and setting up a connection between the district junctor, with which the calling line has been connected, and the selected outgoing trunk. The other set of information includes information required by the sender for completing its operation. This information, which is returned to the sender, tells the sender the type of pulsing required by the identified office, for example, revertive pulsing or PCI code pulsing, the resistance of the selected trunk, the number of digits to be out-pulsed, the number of digits to be expected from the calling subscriber, etc. When this information has been transmitted to the sender and the marker has completed its functions the marker connector and the marker is released.

When the marker has released, the sender sets up a trunk test circuit and, if the result of the trunk test indicates that the distant office is ready to be operated, transfers the trunk test circuit to the fundamental circuit by which the sender may control the distant office. The sender is normally arranged to receive revertive pulses from a panel or crossbar office or to transmit PCI pulses to manual offices equipped with call indicators. When the sender has completed its function, relay 2501 in the district junctor is operated to complete the talking circuit between the calling line and the distant office and the sender releases.

To adapt the subscriber sender above described for direct distance dialing, auxiliary senders are provided, together with a connector for associating an auxiliary sender with the subscriber sender. The subscriber sender is informed that an auxiliary sender will be required by the registration on the second or B register of the digit 0 or the digit 1 which identifies an area code and, therefore, indicates that a 10-digit number is being dialed. When the seventh digit has been registered, the auxiliary sender connector is operated to connect the subscriber sender with the auxiliary sender and, as soon as the eighth digit has been registered, the pulsing circuit is transferred to the auxiliary sender where the ninth and tenth digits are registered on the tens digit register T(14) and the units register U(15) of the auxiliary sender.

The marker is called in in the normal manner but receives the area code rather than the office code. In translating the area code, the marker recognizes that an auxiliary sender will be required and, therefore, sets the class relays of the subscriber sender for PCI code pulsing.

With the auxiliary sender attached to the subscriber sender, the trunk test circuit is switched through to the auxiliary sender so that the trunk test circuit of the subscriber sender terminates in the auxiliary sender and the auxiliary sender establishes the trunk test circuit to the distant office. The auxiliary sender recognizes the ready or assignment indication by the distant office and relays this information to the subscriber sender.

When the auxiliary sender relays the assignment signal to the subscriber sender, the subscriber sender pulses the eight digits registered therein to the auxiliary sender by means of PCI code pulses. In the auxiliary sender these digits are alternately registered on odd register O(16) and even register E(16). While the second digit is being registered on the register E(16), the auxiliary sender transmits the digit registered on register O(16) to the distant office in the form of multifrequency code pulses, after which the odd register is released to receive the third digit. While the third digit is being registered, the second digit is transmitted. Following the registration and transmission of the eighth digit, the ninth and tenth digits, which are registered directly in the auxiliary sender are transmitted. A set of steering relays in the auxiliary sender controls the overlapping operation of receiving digits from the subscriber sender and transmitting digits to the distant office.

The auxiliary sender also permits the office at which it is located to have access to other local offices which require multifrequency pulsing. In this case, the subscriber sender is instructed to call in an auxiliary sender by a special class indication from the marker. Under this condition, all of the dialed digits are registered in the subscriber sender and pulsing terminates when the last digit has been received and transmitted by the auxiliary sender.

Since the auxiliary sender is set by PCI code pulses, only the trunk test circuit and the PCI fundamental circuit have been shown in the subscriber sender. Similarly, since the only digits having special significance in the use of the auxiliary sender are the B digit, the units digit, and the stations digit, the registers for storing these digits have been shown and the remaining registers have been merely indicated.

*Detailed description.—Local PCI call*

Assuming that the subscriber at station 1000 wishes to make a local call to a subscriber at the call indicator office CI(1), the removal of the receiver from the switchhook causes his line to be extended through line switches PLS(1) and SLS(1) to conductors 2549 and 2550 which are further extended by the sender link to conductors 2450 and 2451. The operation of the line switch and the sender link takes place as completely described in the above-identified Carpenter patent. In the subscriber sender conductor 2451 is extended to conductor 3019, front contact of off-normal relay ON1(1), back contact of advance relay AV4(1), middle winding of pulsing relay L(1) to battery, while conductor 2450 is extended to conductor 3020, front contact of relay ON1(1), and back contact of relay AV4(1) to ground. Since conductors 3019 and 3020 are connected together at substation 1000, relay L(1) operates, closing a circuit from ground over a back contact of relay AV1(3), conductor 3615, front contact of relay L(1) to battery through the winding of SR(1). Relay SR(1) is slow to release and prepares the circuit for recording the digits dialed by the subscriber at substation 1000. When the subscriber operates his dial, relay L(1) releases at each interruption of its circuit by the dial and completes a circuit from ground on conductor 3615, back contact of relay L(1), conductor 100, contact 8 of relay DPT(5), conductor 500, front contact of relay SR(1), conductor 3610, back contact of relay STL(1), and conductor 3619 to the pulse divider 101, which in turn alternately grounds conductors 3035 and 3620 to operate the counting relays 102. Conductor 3620 extends over contact 9 of relay DPT(5) to conductor 3039 leading to the counting relay circuit 102. At the end of the digit the counting relays operate one of the select magnets SEL0(2), SEL1(2), SEL9(2) to prepare the crossbar register for operation. The operated magnet extends its operating ground to conductor 3427 and back contact of relay SM3(2) to battery through the winding of relay SM1(2). Relay SM1(2) operates and closes an obvious circuit through the left winding of relay SM2(2) operating the latter relay. Relay SM2(2) in turn operates relay SM3(2). Relay SM3(2) opens the operating circuit for relay SM1(2) but closes a holding circuit for relay SM2(2) through the right winding of the relay under the control of the hold magnet sequence circuit 204. The hold magnet sequence circuit advances as each digit is registered to provide an operating circuit for the proper one of the hold magnets HMA(2) to HMSTA(2). When the hold magnet is operated, relay SM2(2) releases, in turn releasing relay SM3(2) to prepare for the registration of the next digit and to control the operation of the hold magnet individual to the digit whereby the digit dialed is set up on the corresponding crosspoint of the proper level of the register. The operation of the pulse divider, counting relays, the select magnets and hold magnets all takes place as described in detail in the above-identified Carpenter patent. For convenience, the levels which constitute the frame register, the A digit register, and its auxiliary A register and the C digit register, the thousands register, hundreds register and tens register have been indicated merely by boxes. When the third, or C digit has been registered and the hold magnet HMC(2) operates, an auxiliary relay CL(2) is operated which connects ground to conductor 3118 completing a circuit over back contacts of relay TR1(4) and TR3(4) to battery through the winding of relay DST(4).

Relay DST(4) connects battery to conductor 3124 and over a back contact of relay DRL(4) to conductor 3132 leading to the marker connector which selects and connects an idle marker with the sender. The first three digits are then transferred to the marker which translates these three digits into route information by which it selects a trunk outgoing to office CI(1) and operates switches such as switches DPS(1), DSS(1), OPS(1) and OSS(1) to prepare a connection between the calling line and the called office. In addition, the marker determines the nature of the called office and sets up a class indication in the sender to control the further operation of the sender. Since it was assumed that the call was directed to call indicator office CI(1), class relays CL1(4), CL2(3), and CL4(3) are operated. When the marker has completed its functions it operates relay DRL(4) which results in the operation of relays S6(3) and S6'(3). Relay DRL(4) disconects battery from the marker connector, causing the marker connector and the marker to release.

With relay S6'(3) operated, a trunk test circuit is established from the tip of the outgoing trunk through the office and district switches to conductor 2552 which extends through the sender link to conductor 2452, contacts 12 and 10 of relay SWF(5), conductor 501, through compensating resistances Z1(3) and Z2(3) controlled by relays CR3(3) and CR4(3), which are also set by the marker, conductor 3537, front contact of relay S6'(3), front contact of relay CL4(3), back contact of relay CI2(3) through the winding of relay TG(3), inner upper back contact of relay FS1(3), lower winding of relay OF(3), back contact of relay AV2(3), conductor 300, contacts 6 and 8 of relay SWF(5), conductor 2543, through the sender link to conductor 2553, and through the district and office switches to the ring conductor of the trunk. Assuming that the trunk is in satisfactory condition, relay TG(3) will operate, in turn operating relays TG1(3) and TG2(3). Relay TG2(3), in operating, closes a circuit from ground over its contact 4, over front contacts of relays S6(3) and CL4(3), back contact of relay OF1(3), and front contact of relay CL2(3) to battery through the winding of relay CI1(3). Relay CI1(3) operates and closes a locking circuit for itself over the front contact of relay CL2(3), back contact of relay OF1(3), front contact of relay CI1(3) and conductor 3615 to ground at the back contact of relay AV1(3). Relay CI1(3), in turn, operates relay CI2(3). When the operator or sender is ready to receive the called number, the circuit above traced is opened and relay TG(3) releases, in turn releasing relays TG1(3) and TG2(3). With relay TG2(3) released, the out-pulsing circuit extends from conductor 2452 as above traced to conductor 3537, contact 4 of relay CI(3), back contact 1 of relay TG2(3) to the PCI pulsing and control circuit 301 and from conductor 2453 as above traced to conductor 300, back contact of relay AV2(3), contact 3 of relay CI1(3), and contact 3 of relay TG2(3) to the PCI pulsing and control circuit 301. The designation of the called subscriber, as registered in the crossbar register, is now transmitted to the distant office. When out-pulsing has been completed, relay AV1(3) is operated and the subscriber sender restored to normal.

*Seizure of auxiliary sender 10-digit toll call*

As previously mentioned, the auxiliary sender is required either for completing ten-digit toll calls or where the local called office requires multifrequency pulsing.

Ten-digit toll calls are identified by an area code in which the second digit is either 0 or 1. When such a code is registered in the subscriber sender, either crosspoint 3230 or 3231 is operated. These crosspoints represent the digits 0 or 1 in the register which normally registers the second or B office digit. With either crosspoint 3230 or 3231 closed, a circuit is completed from ground over a back contact of relay DRL(4), conductor 400, contact of crosspoint 3230 or 3231, conductor 200, contact 1 of relay DPT(5), contact 2 of relay SA(5), and contact 6 and winding of relay AS(5) to off-normal battery. Relay AS(5) operates in this circuit and locks to ground over its contact 7. When the seventh digit of the designation has been registered, a circuit is completed from ground over a contact of any one of the operated crosspoints 3330 to 3339 of the units register to conductor 201, contact 11 of relay AS(5) and conductor 502 to the start circuit of the auxiliary sender link.

In the case of calls requiring multifrequency outpulsing, the called line designation is registered in the usual manner and the marker indicates that multifrequency pulsing is required by operating relay 7DG(5) which locks over its contact 4 and conductor 503 to ground over front contacts of relays DST(4) and DRL(4) when the marker releases. With relay 7DG(5) operated, a circuit is closed from ground over contact 5 of relay 7DG(5), contact 1 of relay DPT(5), contact 2 of relay SA(5), contact 6 and winding of relay AS(5) to off-normal battery operating relay AS(5). The registration of a digit on the units register is effective as above described to connect ground to the start conductor for the auxiliary sender connector.

The purpose of waiting to close the start circuit for the auxiliary sender link until the seventh digit has been received is both to save on the holding time of the auxiliary sender and thereby reduce the number of auxiliary senders required and to prevent calling in the auxiliary sender when service codes, such as 211, 411, etc., are dialed. Since for a 10-digit call there is only a limited time available during which to seize the auxiliary sender a particularly fast acting link circuit is provided.

The sender link frame comprises ten crossbar switch units whereby any one of one hundred subscriber senders may be connected with any one of ten auxiliary senders, each subscriber sender appearing in one vertical of one switch unit while the auxiliary senders are multipled to corresponding horizontals of all ten switch units. Since the commercial crossbar switch has a maximum of six contacts per crosspoint and more than six leads are required to connect the subscriber sender with an auxiliary sender, in practice each crossbar switch unit would comprise the equivalent of two-ten-point switches, which are operated in parallel, with half of the leads extending through one switch and the other half of the leads extending through the other switch.

Control of the link switches is accomplished by means of a series of chain circuits providing a preference and lockout between the subscriber senders appearing in the same switch and a preference and lockout between the switches so that only one subscriber sender can be connected to an auxiliary sender at a time. The auxiliary senders are also arranged in a preference chain to which the group of subscriber senders have access at different points so as to equalize the wear on the auxiliary senders. If there are enough subscriber senders to require more than one sender link frame, as many connections can be set up simultaneously as there are frames. As soon as one subscriber sender has been connected to an auxiliary sender, another subscriber sender can be connected to another auxiliary sender through the same frame. As many coincident connections can exist as there are auxiliary senders.

Figure 6:
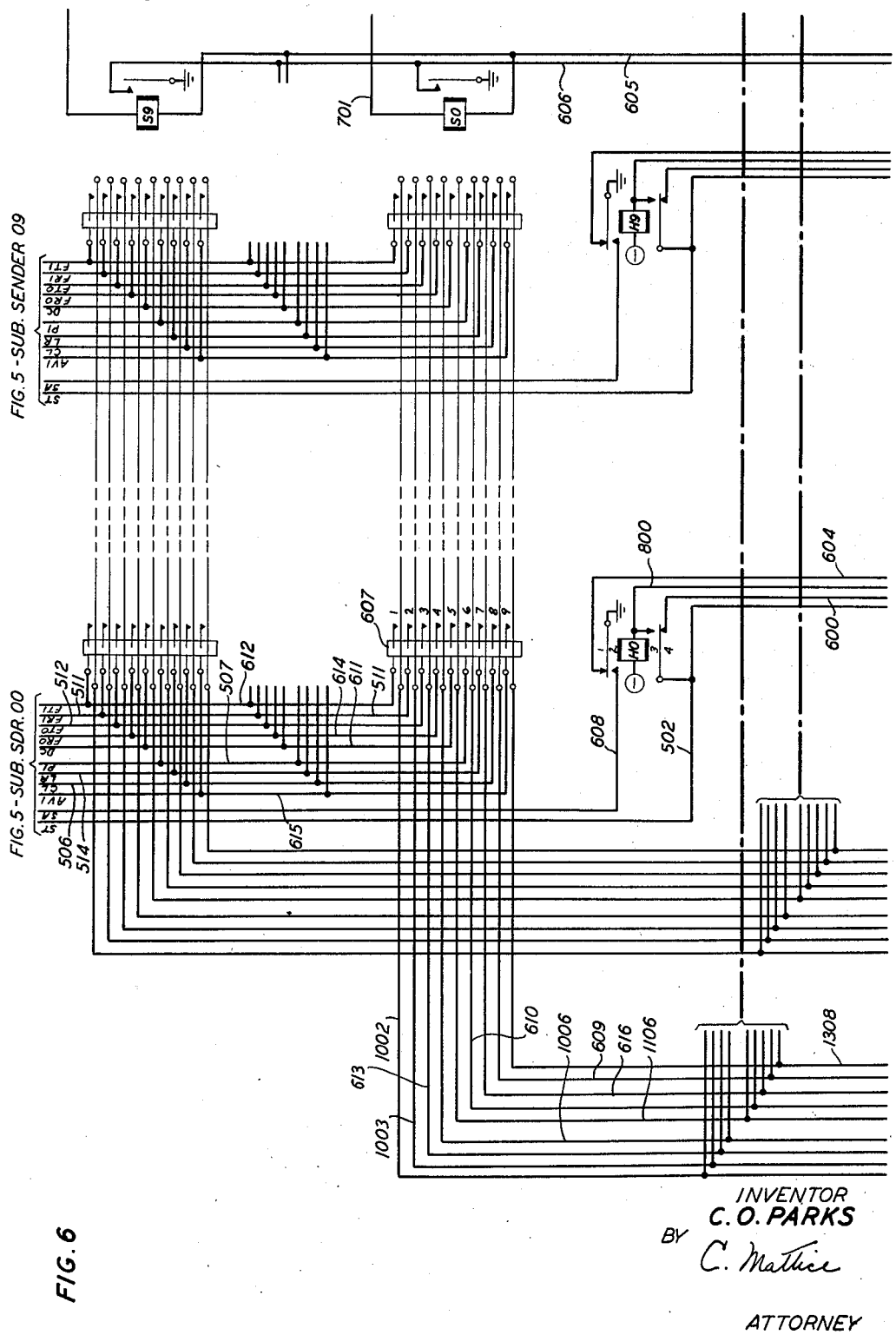
Figs. 6 and 7 show the auxiliary sender connector.
Figure 7:
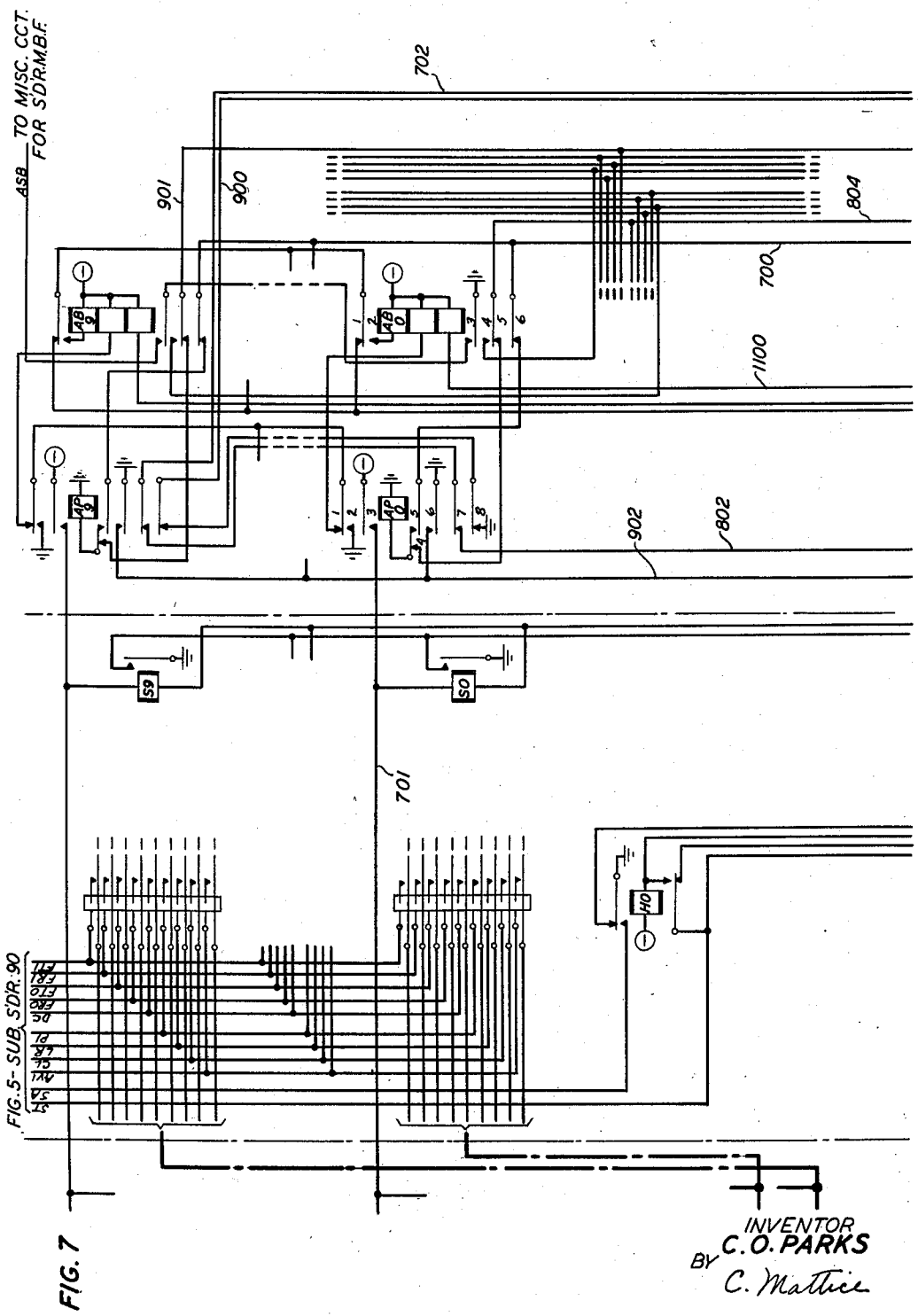
Figure 8:
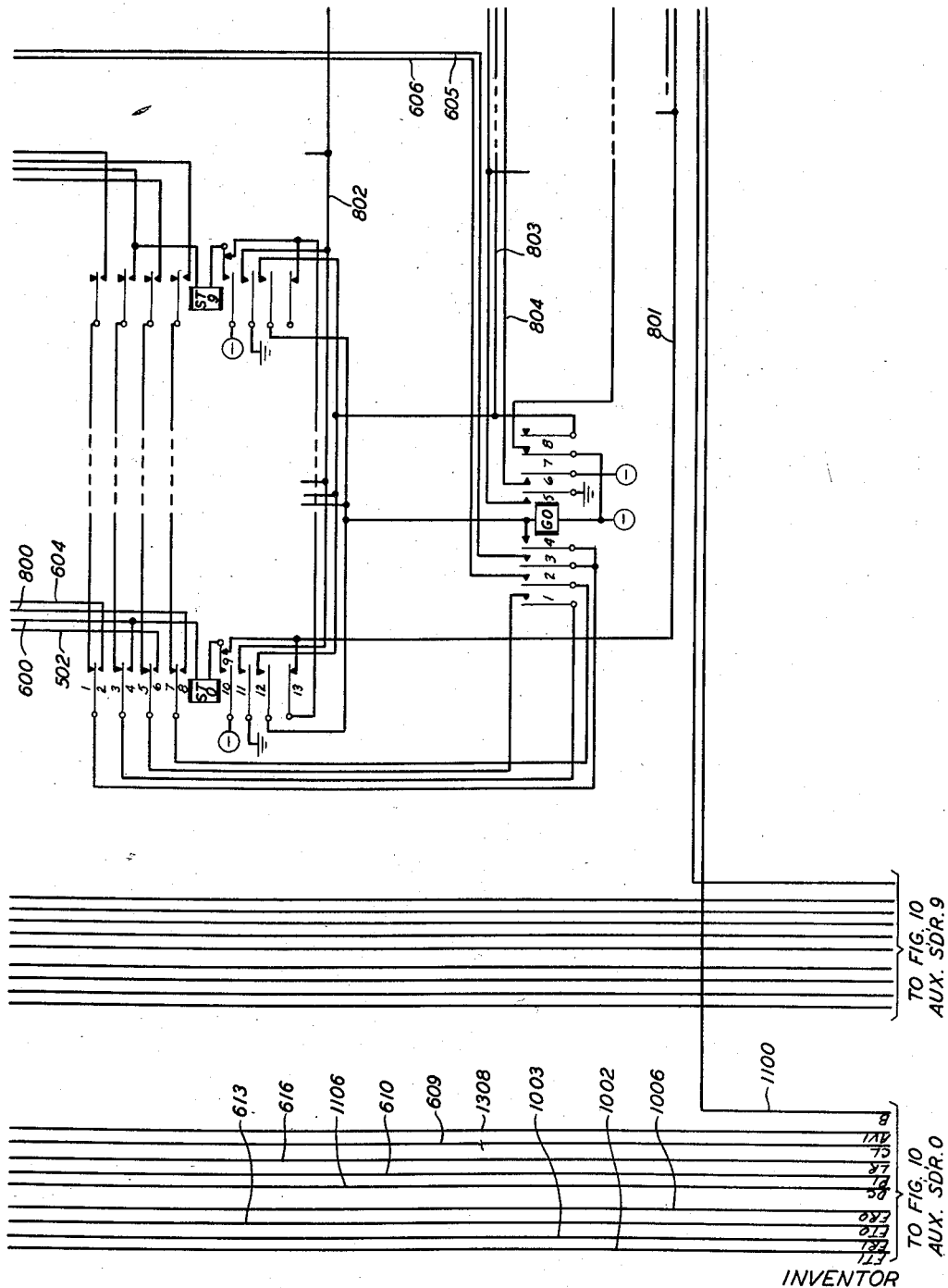
Figs. 8 and 9 show control circuits for the auxiliary sender cponnector.
Figure 9:
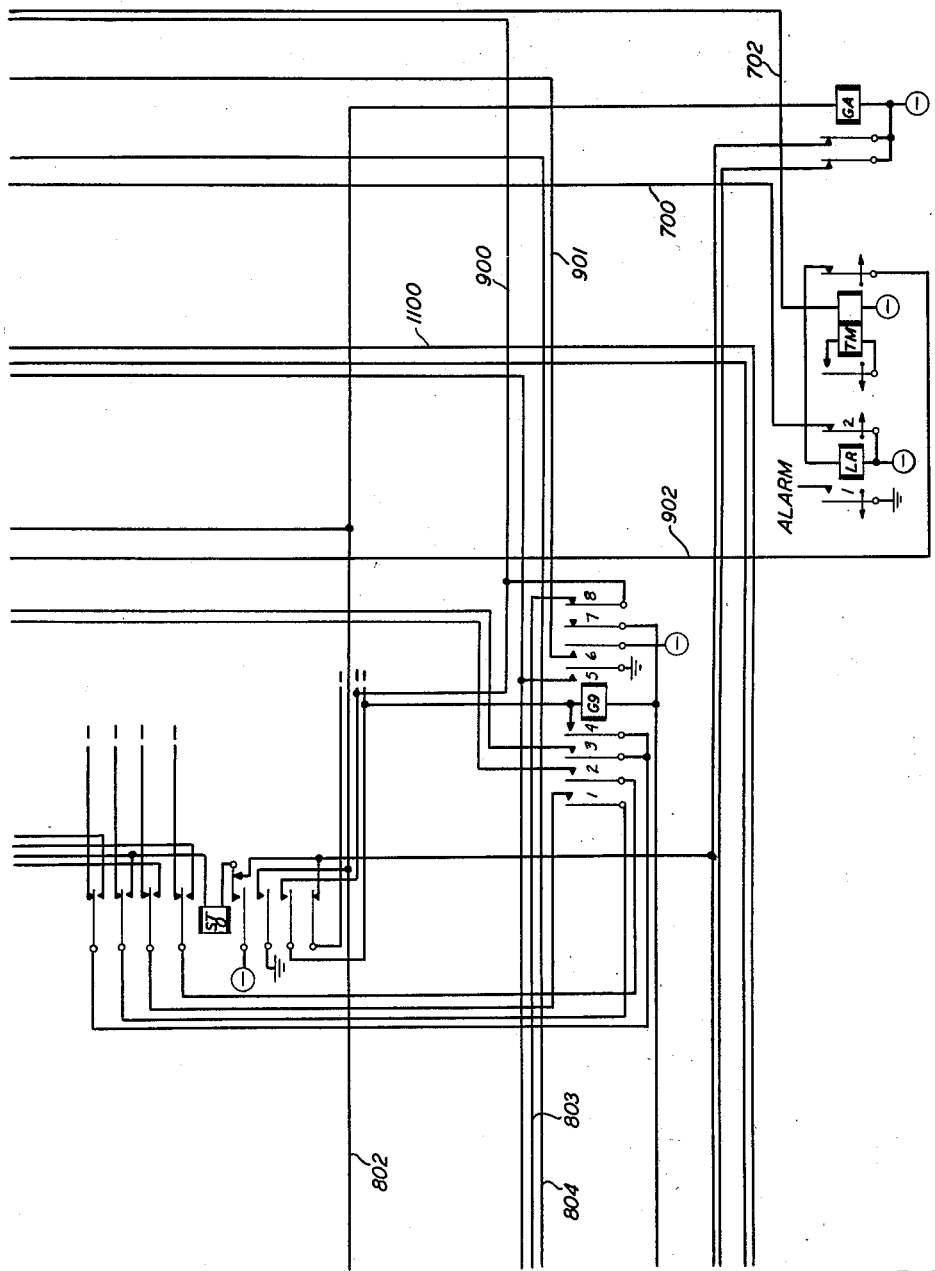
Figure 10:
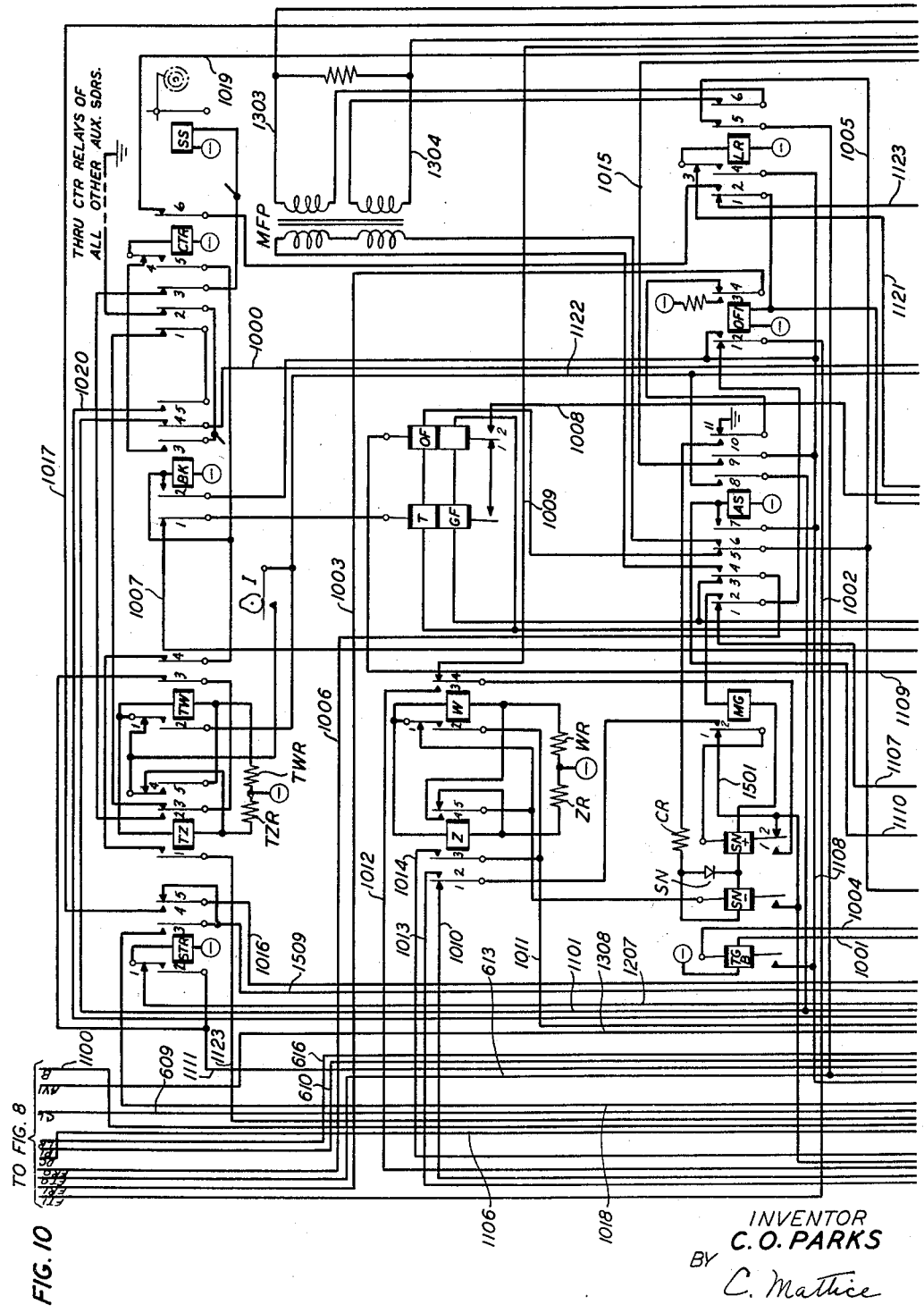
Figs. 10 to 16 show the auxiliary sender, Fig. 10 showing the code pulse receiving relays, Fig. 11 showing trunk test relays and the dial pulse receiving relay, Fig. 12 showing the dial pulse counting relays, Fig. 13 showing the out-pulse generator relays, Figs. 14 and 15 showing two digit registers and the steering relays, and Fig. 16 showing the multifrequency out-pulsing control.
Figure 11:
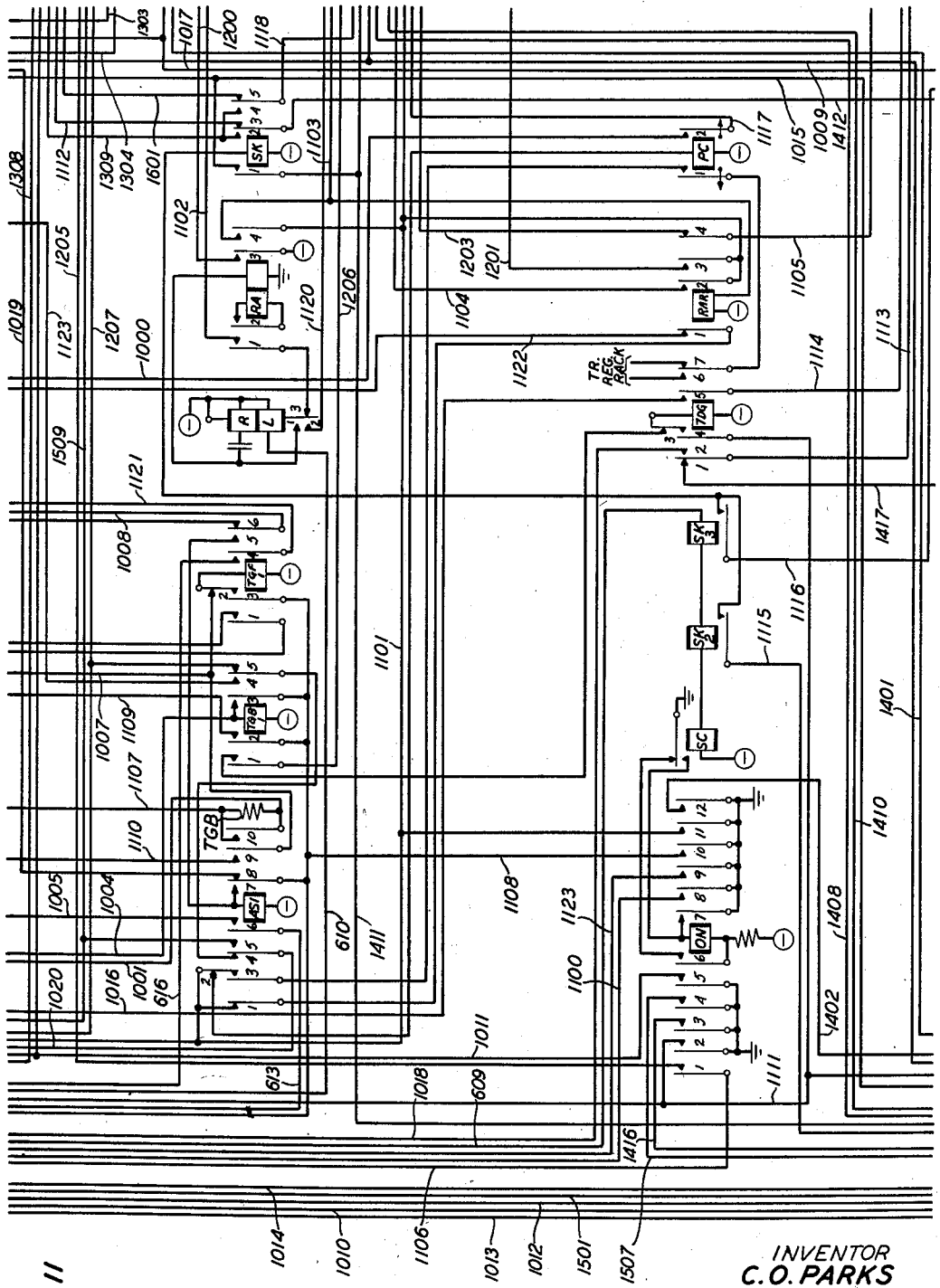
Figure 12:
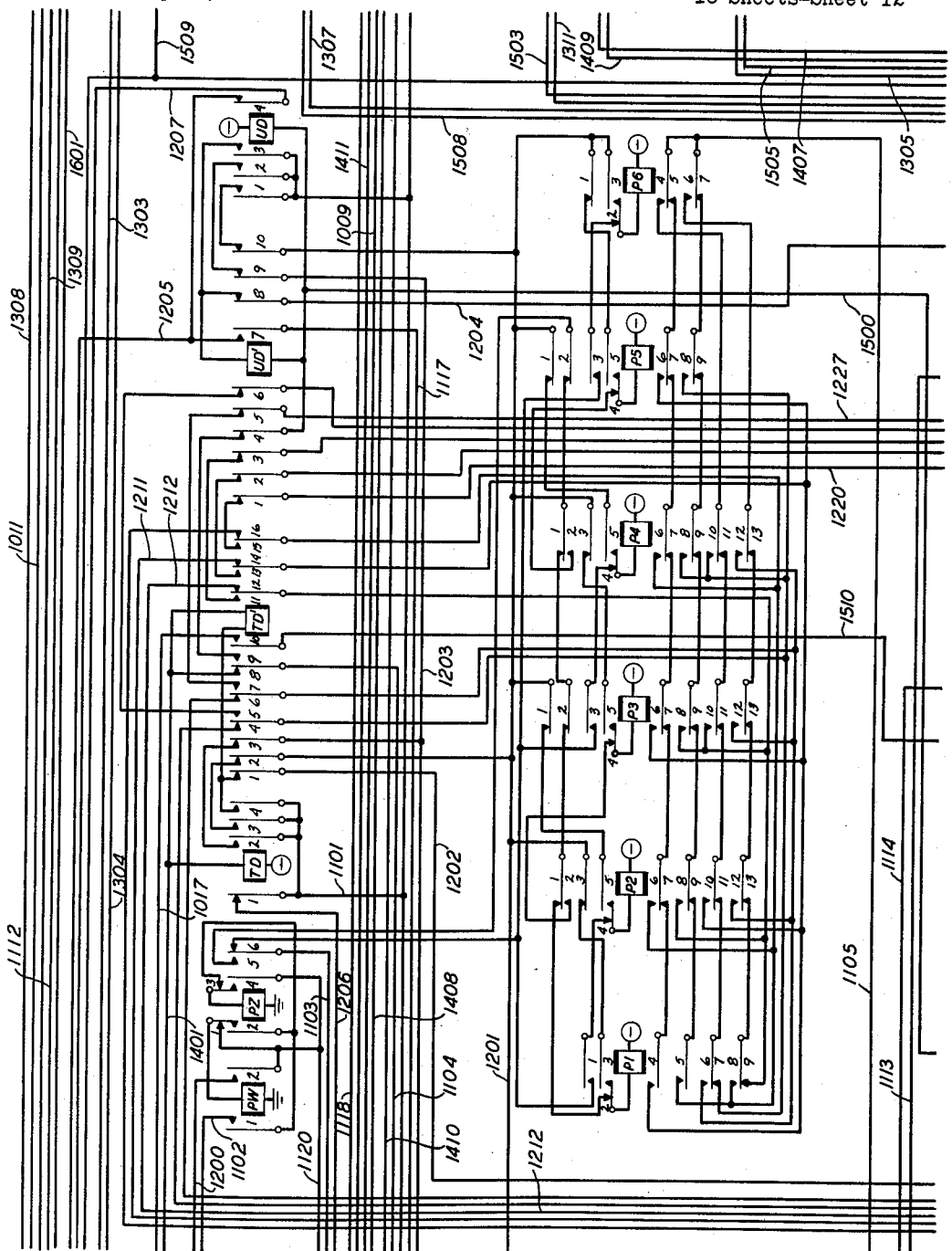
Figure 13:
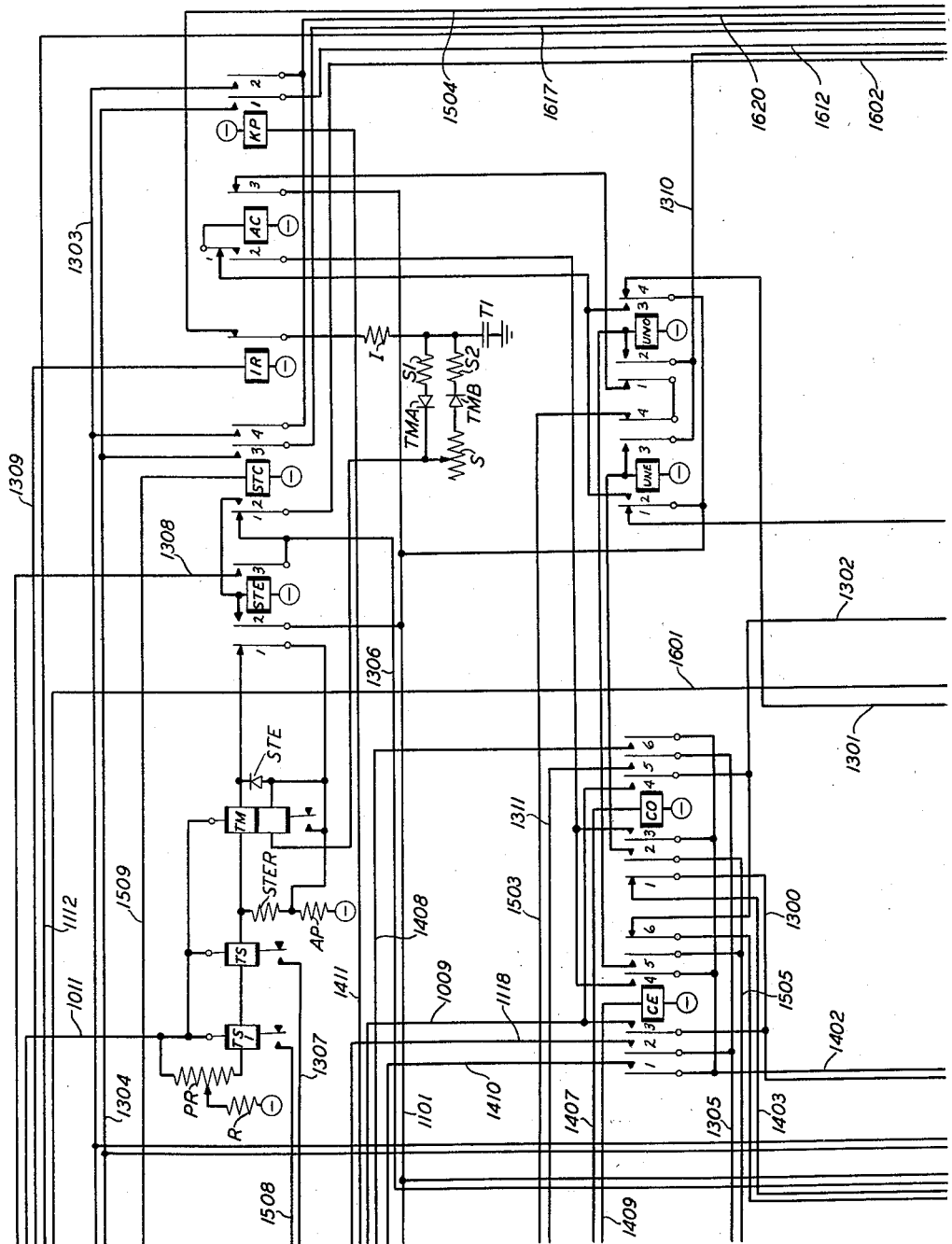

With ground connected to conductor 502, a circuit is completed over a back contact of hold magnet H0(6), conductor 600, winding and contact 9 of relay ST0(8), which is individual to the sender of Figs. 1 to 5, and conductor 801 to battery over back contact of gating relay GA(9). Relay ST0(8) operates in this circuit and locks to battery over its own contact 10. At its contact 13, relay ST0(8) disconnects battery from the windings of other start relays individual to other subscriber senders appearing in the same switch. At its contact 11, relay ST0(8) connects ground to conductor 802, operating the gating relay GA(9) to prevent the later operation of any other start relay in the same or any other group. If no other subscriber sender is attempting to connect with an auxiliary sender at this time, all of the preference relays AP0(7) to AP9(7) individual to the auxiliary senders will be released, and a circuit is closed from battery through the winding of group relay G0(8), contact 12 of relay ST0(8), conductor 803, over the back contacts of intermediate group relays (not shown), back contact of group relay G9(9), conductor 900 over the back contacts of relays AP9(7) to AP0(7) to ground. Group relay G0(8) operates in this circuit and locks over its contact 4, contact 2 of relay ST0(8) and conductor 604 to ground at the back contact of hold magnet H0(6) which is individual to the subscriber sender. Group relay G0(8) connects battery over its contact 6 and conductor 804 to the armature of busy relay AB0(7). There is a preference relay such as relay AP0(7) and a busy relay such as relay AB0(7) for each of the auxiliary senders and the busy relays are arranged in a chain circuit so that any group relay may operate the first preference relay associated with an idle auxiliary sender. The preference circuit closed by each group relay enters the chain at a different point. For example, group relay G9(9) connects battery over its contact 6 and conductor 901 to the armature of busy relay AB9(7). If the auxiliary sender associated with relay AB0(7) is busy, relay AB0(7) will be operated and the circuit above traced to conductor 804 will extend over a front contact of relay AB0(7) to the armature of some other busy relay. Assuming, however, that the first auxiliary sender is idle, relay AB0(7) will not be operated and the circuit closed to conductor 804 will extend over contact 5 of relay AB0(7), contact 4 and winding of relay AP0(7) to ground. Relay AP0(7) operates in this circuit and locks over its contact 5, contact 6 of relay AB0(7) and conductor 700 to battery over the back contact of relay LR(9). At its contact 3, relay AP0(7) connects battery to conductor 701 and to the windings of all select magnets associated with the same auxiliary sender. With relay G0(8) operated, the winding of select magnet S0(6) extends over conductor 605, contact 3 of relay G0(8), and thence to ground over the locking circuit of relay G0(8). Select magnet S0(6) operates and connects ground over conductor 606, contact 2 of relay G0(8), contact 8 of relay ST0(8), and conductor 800 to battery through the winding of hold magnet H0(6). Select magnet S0(6) prepares all of the contacts in the crossbar switch of Fig. 6 which are individual to the selected auxiliary sender. Hold magnet H0(6) is individual to the subscriber sender and closes crosspoint 607 completing the connection of the selected auxiliary sender to the subscriber sender. Hold magnet H0(6), in operating, opens the operating circuit for relay ST0(8), but that relay is held operated temporarily in a locking circuit from battery over contact 10, winding and contact 4 of relay ST0(8), contact 1 of relay G0(8), and contact 6 of relay ST0(8) to conductor 502. Hold magnet H0(6) also disconnects ground from conductor 604 opening the locking circuit for relay G0(8) and the operating circuit for select magnet S0(6). As soon as the auxiliary sender is seized, ground is connected as will be described hereinafter, to conductor 1100 operating busy relay AB0(7) to mark the auxiliary sender busy to the connector circuit. At its contact 6, relay AB0(7) opens the locking circuit for relay AP0(6) causing that relay to release. Relay G0(8) releases, unless some other subscriber sender in the corresponding group is also waiting for an auxiliary sender, in turn releasing relay ST0(8) and restoring the connector control circuit to normal. Hold magnet H0(6) remains operated over its front contact and conductor 502 under the control of the subscriber sender. At its contact 2, hold magnet H0(6) connects ground to conductor 603 completing a circuit over contact 4 of relay AS(5) to battery through the winding of relay SA(5) as a signal to the subscriber sender that the auxiliary sender has been attached.

Relay SA(5) operates and locks over its contact 6 and contact 8 of relay 7DG(5) to off-normal ground. With relay SA(5) operated a circuit is closed from ground, connected to conductor 201 by the operated crosspoint of the units register as previously described, contact 7 of relay SA(5), contact 5 of relay AS(5) to battery through the winding of relay SWF(5). Relay SWF(5) operates and inserts the auxiliary sender equipment in the fundamental circuit as will be traced hereinafter. It also makes certain adjustments in the PCI pulsing circuit to adapt it for pulsing to the auxiliary sender.

In the meantime the subscriber sender has been receiving the eighth digit. When the eighth digit has operated the counting relays and the select magnets, hold magnet HMSTA(2) is not immediately operated but a circuit is closed from ground on the operating circuit of the select magnet, conductor 3427, back contact of relay SM3(2) to battery through the winding of relay SM1(2). Relay SM1(2) operates and closes an obvious circuit through the left winding of relay SM2(2) causing that relay to operate. Relay SM2(2), in turn, operates relay SM3(2). Relay SM3(2) closes a circuit from ground over its front contact through the right winding of relay SM2(2) to the hold magnet sequence circuit 204, which for other digits extends as previously described, directly to the winding of the associated hold magnet. For the present digit, the circuit extends over conductor 202, contact 9 of relay AS(5), contact 1 of relay 7DG(5), contact 5 and winding of relay DPT(5) to battery. Relay DPT(5) operates in this circuit and locks over its contact 6 through resistor 504 to ground. With relay DPT(5) operated, the circuit above traced to conductor 202 is extended over contact 4 of relay DPT(5) and conductor 505 to battery through the winding of hold magnet HMSTA(2). The hold magnet operates in this circuit and locks over a circuit not shown. When relay SM3(2) operated, it opened the circuit of relay SM1(2) which in turn opened the circuit to the left winding of relay SM2(2), but relay SM2(2) was held operated in the circuit by which relay DPT(5) was operated. When the hold magnet HMSTA(2) locks, ground on that circuit shunts the right winding of relay SM2(2) and causes that relay to release, in turn releasing relay SM2(2). It may be noted that if relay AS(5) is not operated, the operating circuit for magnet HMSTA(2) is completed over contact 8 of relay AS(5) without the intervening operation of relay DPT(5).

When the subscriber sender is connected to the auxiliary sender by the closure of crosspoint 607, a class indication is transmitted from the subscriber sender to the auxiliary sender by connecting ground to conductor 506. The resistance of this ground connection is controlled by relays 7DG(5), SK2(5), and SK3(5). Relays SK2(5) and SK3(5) are operated under the control of the marker when less than all of the digits are to be transmitted to the distant office, as will be described hereinafter. Relay 7DG, as above described, is operated when a seven or eight-digit designation is to be transmitted by means of multifrequency pulses. Assuming that none of these relays are operated, ground will be connected over contact 3 of relay SK2(5) through resistors SK(5) and SK1(5), contact 3 of relay SK3(5), contact 8 of relay SA(5) to conductor 506, and thence over contact 8 of crosspoint 607 and conductor 609 through the windings of relays SK3(11), SK2(11), and SC(11) to battery. With resistances SK(5) and SK1(5) included in this circuit, only relay SC(11) will operate. Relay SC(11) closes an obvious circuit for off-normal relay ON(11), relay ON(11) operating to supply ground to the auxiliary sender. At its contact 8, relay ON(11) connects ground to conductor 1100 to operate the busy relay AB0(7) in the link circuit.

*Dial pulse registration in auxiliary sender*

The operation of relay DPT(5) prepares for the registration of the ninth and tenth digits in the auxiliary sender. With relay DPT(5) operated, the pulsing circuit controlled by relay L(1) extends, as previously traced, from ground at the back contact of relay AV1(3) to conductor 100 but is now disconnected at contact 8 of relay DPT(5) from the pulse divider 101 and is extended over contact 7 of relay DPT(5), conductor 507, contact 6 of crosspoint 607, conductor 610, to lower winding of relay RL(11) and battery. Relay RL(11) is a polar pulsing relay similar to relay L(1). When relay L(1) releases at the first pulse of the ninth digit, the above-traced circuit for relay RL(11) is completed and that relay operates to close a circuit from battery over its contact 1 to ground through the right winding of relay RA(11) operating the latter relay. Relay RA(11), in operating, short-circuits its left winding to make itself slow to release. A circuit is also closed from battery over contact 2 of relay RL(11), conductor 1120, and contact 1 of relay PZ(12) to ground through the winding of relay PW(12). Relay PW(12) operates in this circuit and locks over contact 1 of relay PZ(12), contact 2 of relay PW(12), and conductor 1200 to battery over contact 3 of relay RA(11).

When off-normal relay RA(11) operates, it closes a circuit from ground over contact 11 of relay ON(11), conductor 1101, and contact 4 of relay RA(11) to battery through the winding of relay RAR(11) operating the later relay.

At the end of the first pulse, when relay L(1) reoperates, relay RL(11) releases, closing its contact 3, and completes a circuit from battery, contact 3 of relay RL(11), contact 1 of relay RA(11), conductor 1102, contact 1 of relay PW(12), contact 3 and winding of relay PZ(12) to ground. Relay PZ(12) operates and locks over its contact 4, contact 2 of relay PW(12), and conductor 1200 to battery at contact 3 of relay RA(11). With relay PZ(12) operated, the previously-traced locking circuit for relay PW(12) is opened but relay PW(12) remains operated in a circuit extending from ground through the winding of relay PW(12), contact 2 of relay PZ(12), contact 1 of relay PW(12), conductor 1102, and contact 1 of relay RA(11) to battery over contact 3 of relay RL(11). Therefore, relay PW(12) remains operated until relay RL(11) is reoperated at the next pulse. At the beginning of the second pulse when relay RL(11) disconnects battery from its contact 3, relay PW(12) releases, opening the previously traced locking circuit from relay PZ(12) but relay PZ(12) remains operated in a circuit extending from ground through the winding and contact 4 of relay PZ(12) and conductor 1120 to battery over contact 2 of relay RL(11). At the end of the second pulse, relay RL(11) again releases and relay PZ(12) releases, restoring the circuit for reoperating relay PW(12) in response to the third pulse.

Relays PW(12) and PZ(12) therefore act as a pulse divider for operating the counting relays P1(12) to P6(12). From the foregoing description it will be apparent that at the end of the first and each odd numbered pulse, relay PZ(12) is operated, while at the end of the second and each even numbered pulse, relay PZ(12) is released. Therefore, at the end of the first pulse a circuit is closed from ground over contact 11 of relay ON(11), conductor 1101, contact 4 of relay RA(11), conductor 1103, contact 5 of relay PZ(12), contact 2 of relay P5(12), contact 1 of relay P4(12), contact 2 of relay P3(12), contact 1 of relay P2(12), contact 2 and winding of relay P1(12) to battery. Relay P1(12) operates in this circuit and locks over its contact 3, contact 3 of relay P2(12), conductor 1201, and contact 3 of relay RAR(11) to ground on conductor 1101. At the end of the second pulse, ground on conductor 1103 is extended over contact 6 of relay PZ(12), contact 1 of relay P1(12), contact 4 and winding of relay P2(12) to battery. Relay P2(12) operates and locks over its contact 5 and contact 1 of relay P3(12) to ground on conductor 1201. With relay P2(12) operated, the locking circuit of relay P1(12) is opened and relay P1(12) releases.

When relay PZ(12) operates at the end of the third pulse, a circuit is closed from ground on conductor 1103, contact 5 of relay PZ(12), contact 2 of relay P5(12), contact 1 of relay P4(12), contact 2 of relay P3(12), contact 2 of relay P2(12), contact 4 and winding of relay P3(12) to battery. Relay P3(12) operates and locks over its contact 5 and contact 3 of relay P4(12) to ground on conductor 1201. Relay P3(12), in operating, opens the locking circuit of relay P2(12) causing the latter relay to release. When relay PZ(12) releases at the end of the fourth pulse, ground on conductor 1103 is connected over contact 6 of relay PZ(12), contact 3 of relay P3(12), contact 4 and winding of relay P4(12) to battery. Relay P4(12) operates and locks over its contact 5 and contact 1 of relay P5(12) to ground on conductor 1201.

When relay PZ(12) operates at the end of the fifth pulse, a circuit is closed from ground on conductor 1103, contact 5 of relay PZ(12), contact 2 of relay P5(12), contact 2 of relay P4(12), contact 4 and winding of relay P5(12) to battery. Relay P5(12) operates and locks over its contact 5 and contact 1 of relay P6(12) to ground on conductor 1201. When relay PZ(12) releases at the end of the sixth pulse, a circuit is closed from ground on conductor 1103 over contact 6 of relay PZ(12), contact 3 of relay P5(12), contact 2 and winding of relay P6(12) to battery. Relay P6(12) operates in this circuit and locks over its contact 3 to conductor 1201, thereby remaining operated until the end of the digit. Relay P6(12) opens the locking circuit of relay P5(12) which releases. When relay PZ(12) operates at the end of the seventh pulse, the original operating circuit for relay P1(12) is again closed and that relay operates and locks in the same manner as for the first pulse. Similarly, relays P2(12), P3(12), and P4(12) operate at the end of the eighth, ninth, and tenth pulses. These relays lock and release in the manner previously desribed.

The operation of the counting relays P1(12) to P6(12) for ten pulses, corresponding to the digit zero has been described, but it will be understood that only one of the relays P1(12) to P5(12) with or without relay P6(12) will remain operated at the end of the digit in accordance with the digit dialed. At the end of the digit, relay RL(11) remains released long enough to permit relay RA(11) to release, in turn releasing relay RAR(11). When relay RAR(11) operated as above described, a circuit was completed from ground over contact 11 of relay ON(11), conductor 1101, contact 2 of relay RAR(11), conductor 1104, and contact 8 of relay TD'(12) to battery through the winding of relay TD(12). Relay TD(12) operates in this circuit and closes a locking circuit for itself which extends from battery through the winding of relay TD(12), winding of relay TD'(12), and contact 4 of relay TD(12) to ground on conductor 1101. However, ground on conductor 1104 and contact 8 of relay TD'(12) is connected in shunt of the winding of relay TD'(12), and that relay does not operate in the locking circuit of relay TD(12) at this time. When relay RAR(11) releases, during the interdigital interval, this shunt is removed from the wind- of relay TD'(12) and that relay operates. Relay RAR(11) also opens the locking circuit for the operated counting relay, but the operated counting relay is held operated in a circuit which extends from conductor 1201 over contact 2 of relay TD(12) and contact 3 of relay TD(12) to conductor 1101 until relay TD'(12) operates. The winding of relay TD'(12) is also shunted by a circuit extending from ground on conductor 1101, contact 4 of relay TD(12), contact 1 of relay TD'(12), conductor 1202 over contacts 1 of the tens register relays T7(14) to T1(14) and conductor 1401 to prevent the operation of relay TD'(12) until at least two of the relays of the tens register have operated. It may be noted that the contacts of relays T0(14) to T7(14) are so arranged that the shunt circuit is closed with none or any one of these relays operated but is opened as soon as a second relay operates.

Assuming, for example, that the digit 3 has been dialed, relay P3(12) will remain operated at the end of the digit and a circuit will be closed from ground on conductor 1101, contact 2 of relay TD(12), contact 3 of relay TD'(12), conductor 1203, contact 4 of relay RAR(11), conductor 1105, contact 5 of relay P6(12), contact 7 of relay P5(12), contact 7 of relay P4(12), contact 6 of relay P3(12), contact 14 of relay TD'(12), conductor 1211 to the winding of relay T1(14) and battery. Relay T1(14) operates and locks over its contact 4 and conductor 1402 to ground at contact 12 of relay ON(11). A second circuit is completed extending from ground on conductor 1105 over contact 7 of relay P6(12), contact 9 of relay P5(12), contact 9 of relay P4(12), contact 8 of relay P3(12), contact 12 of relay TD'(12), conductor 1212 to the winding of relay T2(14) and battery. Relay T2(14) locks over its contact 4 to ground on conductor 1402. With both relays T1(14) and T2(14) operated, the shunt is removed from the winding of relay TD'(12) and that relay operates. When relay TD'(12) operates, it opens the locking circuit for the counting relays and relay P3(12) releases. The auxiliary sender is now ready to receive the tenth and last digit.

The operation of counting this tenth digit takes place in the same manner as in the case of the previous digit. When relay RAR(11) operates following the first pulse of the digit, a circuit is closed from battery through the winding of relay UD(12), contact 4 of relay UD'(12), contact 9 of relay TD'(12), conductor 1104, and contact 2 of relay RAR(11) to ground on conductor 1101. Relay UD(12) closes a locking circuit for itself through the winding of relay UD'(12) and contact 3 of relay UD(12) to ground on conductor 1101, but relay UD'(12) is shunted by the operating circuit for relay UD(12) so that relay UD'(12) does not operate.

Figure 15:
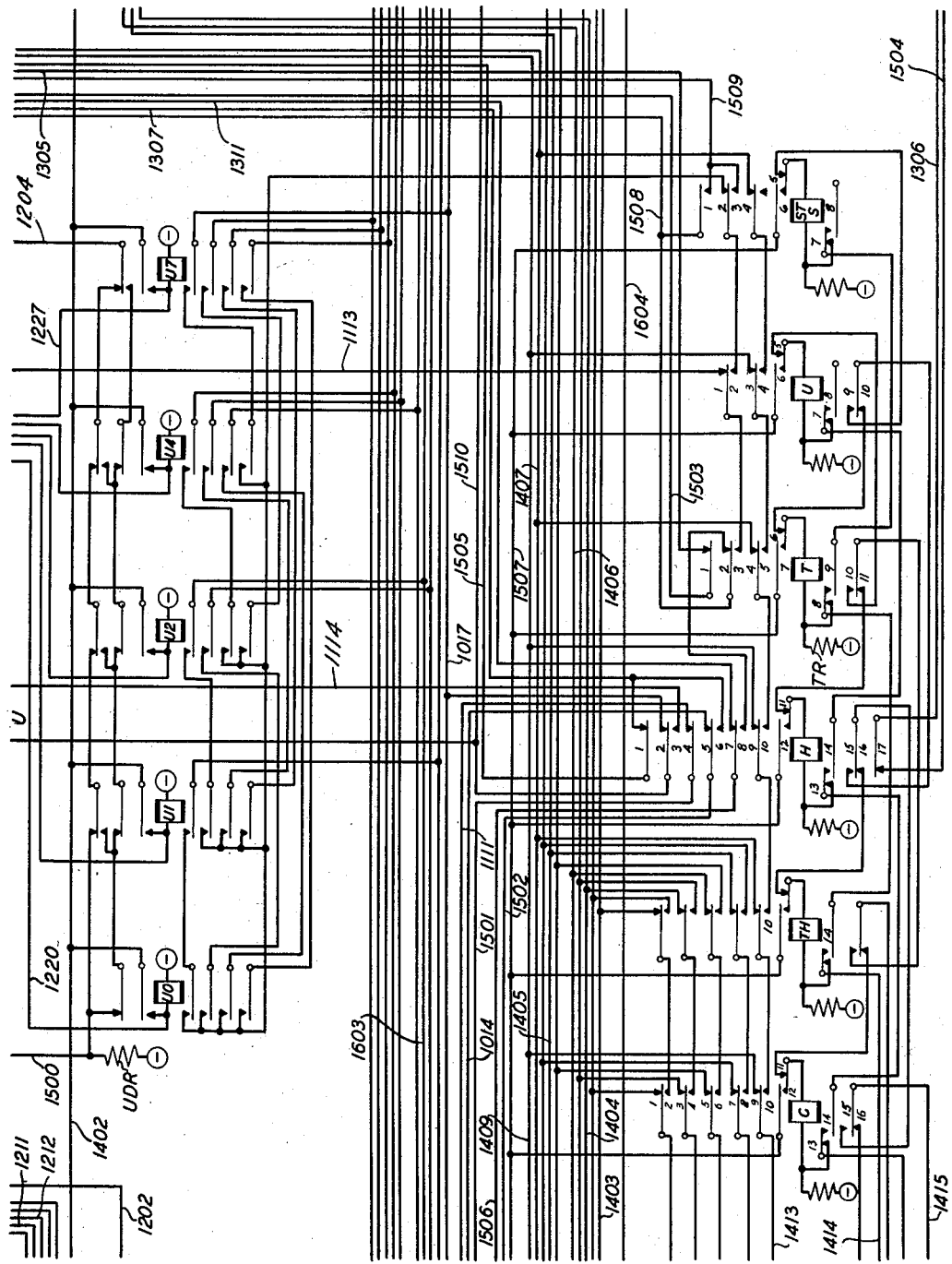
Figure 16:
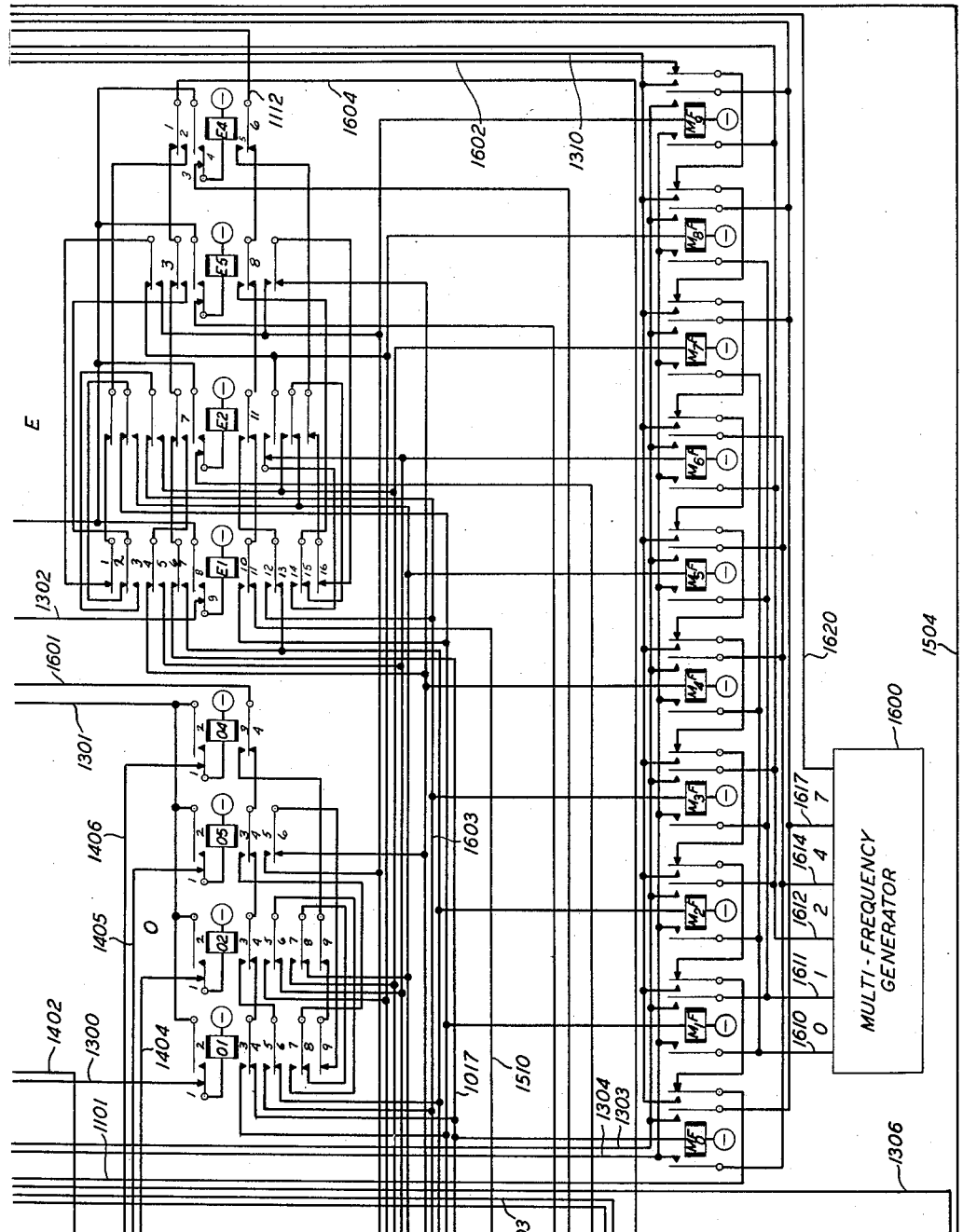

Assuming that the tenth digit is 7, relays P6(12) and P1(12) will remain operated at the end of the digit. When relay RAR(11) releases, circuits are closed for operating the units register of Fig. 15. These circuits may be traced from ground on conductor 1101, contact 4 of relay RAR(11), conductor 1105, contact 4 of relay P6(12), contacts 11 of relays P4(12), P3(12), and P2(12); contact 6 of relay P1(12), contact 7 of relay TD'(12), contact 5 of relay UD'(12), conductor 1227, winding of relay U7(15) to battery; and from conductor 1105 over contact 6 of relay P6(12), contacts 13 of relays P4(12), P3(12), and P2(12); contact 8 of relay P1(12), contact 15 of relay TD'(12), contact 1 of relay UD'(12), conductor 1220, winding of relay U0(15) to battery. Relays U0(15) and U7(15) operate in these circuits and lock to ground over conductor 1402. The release of relay RAR(11) opens the operating circuit for relay UD(12), but relay UD'(12) is also shunted over its contact 8, conductor 1204, contacts 1 of relays U7(15), U4(15), U2(15), and U1(15); and conductor 1500. It may be noted that the connection between conductors 1204 and 1500 is also complete whenever none or only one of the register relays U0(15) to U7(15) is operated. Therefore, the shunt is not removed from relay UD'(12) until two of the register relays have operated. When this occurs, relay UD'(12) operates, disconnecting the counting relays P1(12) to P6(12) from the register relays U0(15) to U7(15).

*Trunk test*

When relay ON(11) operated, connecting ground to conductor 1101, a circuit was completed over contact 2 of relay AS1(11) to battery through the winding of relay PC(11) operating the latter relay. Therefore, when relay UD'(12) operates, a circuit is closed from ground on conductor 1101, contact 4 of relay BK(10), conductor 1000, contact 2 of relay PC(11), conductor 1117, contact 7 of relay UD'(12), conductor 1205, contact 1 of relay ON(11), conductor 1106, contact 5 of crosspoint 607, conductor 611, contact 11 of relay 7DG(5), contact 12 of relay AS(5), and conductor 510 to battery through the winding of relay STL(1) as an indication to the subscriber sender that dialing has been completed. In the manner completely described in the above-identified Carpenter patent, the operation of relay STL(1) causes the establishment of the fundamental circuit, and since the designation already registered in the subscriber sender will be transmitted to the auxiliary sender by means of call indicator pulsing, the marker causes the operation of class relays CL2 and CL4 so that the fundamental circuit for trunk test is similar to the circuit previously traced for the call to call-indicator office CI(1). However, the operation of relay SWF (5) transfers the trunk test circuit from the outgoing trunk conductors to the auxiliary sender, and also extends the outgoing trunk conductors to the auxiliary sender. The trunk test circuit, in its present form, may be traced from battery through the winding of relay TGB(10), conductor 1001, resistor TGB(11), conductor 1107, contact 1 of relay AS(10), contact 1 of relay OF1(10), conductor 1002, contact 1 of crosspoint 607, conductor 612, contact 5 of relay SWF(5), conductor 300, contact of relay AV2(3), lower winding of relay OF(3), contact of relay FS1(3), winding of relay TG(3), contact of relay CI2(3), front contact of relay CL4(3), contact of relay S6'(3) through one or more of resistors Z1(3) and Z2(3) depending upon which of the relays CR3(3) and CR4(3) has been operated by the marker, conductor 501, contact 9 of relay SWF(5), conductor 511, contact 2 of crosspoint 607, conductor 1003, contact 4 of relay OF1(10), and contact 11 of relay AS(10) to ground. The resistance of resistor TGB(11) is so high that relay TG(3) cannot operate, and the direction of current flow is such that relay OF(3) does not operate. However, if the circuit is correctly established, relay TGB(10) does operate and closes a circuit from ground over contact 10 of relay ON(11), conductor 1108, contact of relay TGB(10), and conductor 1004 to battery through the winding of relay TGB1(11). Relay TGB1(11) operates in this circuit and locks over its contact 3 to ground on conductor 1108. A circuit for testing the outgoing trunk is also established in the auxiliary sender, which may be traced from the tip of the outgoing trunk through the switches to conductor 2552, through the sender link, conductor 2452, contact 11 of relay SWF(5), conductor 512, contact 3 of crosspoint 607, conductor 613, contact 5 of relay LR(10), conductor 1005, contact 5 of relay AS(10) through the upper windings of relays OF(10) and TGF(10) and then through the lower windings of relays OF(10) and TGF(10), contact 3 of relay AS(10), conductor 1006, contact 4 of crosspoint 607, conductor 614, contact 7 of relay SWF(15), conductor 2453 through the sender link to conductor 2553, and thence through the switches to the ring conductor of the distant office. With the two windings of relays TGF(10) and OF(10) included in this test circuit, the equipment at the distant office is not operated, but if the equipment is in satisfactory condition, and is ready for assignment, then relay TGF(10) operates and relay OF(10) remains normal. With relay TGB1(11) operated, to indicate that the subscriber sender has established its test bridge, the operation of relay TGF(10) closes a circuit from ground on conductor 1108, contact 2 of relay TGB1(11), conductor 1109, normally closed contact 1 of relay OF(10), contact of relay TGF (10), contact 1 of relay BK(10), conductor 1007, contact 2 and winding of relay TGF1(11) to battery. Relay TGF1(11) operates in this circuit and locks over its contact 3 to ground on conductor 1108. With relay TGF1(11) operated, a shunt is closed around the lower windings of relays TGF(10) and OF(10) at contact 1 of relay TGF1(11) thereby reducing the resistance in the test circuit as a signal to the distant office to attach an incoming sender at that office. When the incoming sender has been attached, the polarity connected to the trunk is momentarily reversed, causing relay OF(10) to operate and relay TGB(10) to release. With relay OF(10) operated, a circuit is closed from ground on conductor 1108, contact 2 of relay TGB1(11), conductor 1109, contact 2 of relay OF(10), conductor 1008, and contact 5 of relay TGF1(11) to battery through the winding of relay AS1(11). Relay AS1(11) operates and locks over its contact 7 to ground on conductor 1108. Relay AS1(11) at its contact 6 connects conductor 1005 to conductor 613 to render the incoming pulsing circuit independent of relay LR(10). Relay AS1(11), in operating, closes at its contact 10 a shunt around resistor TGB(11) thereby increasing the current through the winding of relay TG(3) sufficiently to operate that relay. Relay TG(3) operates relay TG1(3) over a back contact AV1(3) and relay TG1(3), in turn, operates relay TG2(3). Relay TG2(3) closes a circuit from ground over its contact 4, contact of relay S6(3), contact of relay CL4(3), back contact of relay OF1(3), and contact of relay CL2(3) to battery through the winding of relay CI1(3). Relay CI1(3), in turn, operates relay CI2(3). Relay CI2(3) opens the original operating circuit for relay TG(3), but with relay TG2(3) operated, the fundamental circuit is extended from conductor 3537 over a front contact of relay CI1(3) and a front contact 2 of relay TG2(3) to the winding of relay TG(3) independent of the contact of relay CI2(3). Therefore, relay TG(3) remains operated under the control of the auxiliary sender.

At the end of the momentary reversal, relay OF(10) releases and relay TGF(10) reoperates, completing a circuit from ground on conductor 1108, contact 2 of relay TGB1(11), conductor 1109, contact 1 of relay OF(10), contact of relay TGF(10), contact 1 of relay BK(10), conductor 1007, contact 9 of relay AS1(11), and conductor 1110 to battery through the winding of relay AS(10). Relay AS(10) operates in this circuit and locks over its contact 7 to ground on conductor 1108. With relay AS(10) operated, the circuit of relay TG(3) is transferred from battery and ground to a dry bridge which may be traced from conductor 1003 over contact 4 of relay OF1(10), contact 10 of relay AS(10) through the windings of relays SN—(10), SN+(10), and MG(10), contact 2 of relay AS(10), and contact 1 of relay OF1(10) to conductor 1002. The transfer of the circuit of relay TG(3) from battery and ground to the above-traced dry bridge causes relay TG(3) to release, in turn releasing relays TG1(3) and TG2(3). With relay TG2(3) released, the part of the fundamental circuit connecting the subscriber sender with the auxiliary sender is transferred to the PCI pulsing and control circuit 301, extending from conductor 501 through one or more of the resistors Z2(3) and Z1(3), conductor 3537, contact 4 of relay CI1(3), contact 1 of relay TG2(3) to the PCI pulsing circuit 301 and from conductor 300, back contact of relay AV2(3), contact 3 of relay CI1(3) and contact 3 of relay TG2(3) to the PCI pulsing circuit 301. The operation of relay AS(10) also transfers the outgoing section of the fundamental circuit from the test relays TGF(10) and OF(10) to the left winding of the repeating coil MFP(10).

*Receiving designation*

As completely described in the above-identified Carpenter patent, the PCI pulsing code comprises a set of four pulse periods for each digit, a negative pulse being transmitted during the second and fourth periods of each digit to control the sequence of the digits. A positive pulse may or may not be transmitted in the first and third pulse periods, while the negative pulses may or may not be heavy. Because it was required by the circuits for which this PCI code was originally designed, the code for the thousands digit differs from that used for the remaining digits. Following is a table showing the code as applied to the thousands digit and to the remaining digits:

| Digit | Regular Code | Thousands Code |
| --- | --- | --- |
| 0 | -n-n | -n-n |
| 1 | pn-n | -n-N |
| 2 | -N-n | pn-n |
| 3 | pN-n | pn-N |
| 4 | -npn | -N-n |
| 5 | -n-N | -N-N |
| 6 | pn-N | pN-n |
| 7 | -N-N | pN-N |
| 8 | pN-N | -npn |
| 9 | -npN | -npN |

In the table p represents positive pulses which operate relay SN+(10), N indicates a heavy negative pulse, which operates both relay SN—(10) and relay MG(10) and n represents a light negative pulse which operates relay SN—(10) alone.

Multifrequency pulses are transmitted to the distant office overlapping the reception of the PCI pulses, but for convenience, the description of the code and the manner of transmitting these impulses will be described hereinafter.

For the purposes of this description, let us assume that the area code registered on the A, B, and C registers of the subscriber sender is 315. From the above table it will appear that the first pulse is a positive pulse, thereby causing the operation of relay SN+(10). At this time none of the steering relays is operated and relay SN+(10), operated, closes a circuit from ground at contact 2 of relay ON(11), conductor 1111, contact 4 of relay H(15), conductor 1501, contact 1 of relay MG(10), contact 1 of relay SN+(10), contact 4 of relay W(10), conductor 1009, contact 1 of relay ACA(14), conductor 1403, contact 1 of relay CO(13), conductor 1300, and contact 1 and winding of relay O1(16) to battery. Relay O1(16) operates in this circuit and locks over its contact 2, conductor 1301 and contact 4 of relay UNO(13) to ground on conductor 1101. At the end of the first pulse period, relay SN+(10) releases.

During the second pulse period, a heavy negative pulse is received, causing the operation of both relays SN—(10) and MG(10). Relay MG(10) closes a circuit from ground on conductor 1501 as above traced, contact 2 of relay SN+(10), contact 2 of relay MG(10), contact 1 of relay Z(10), conductor 1010, contact 3 of relay ACA(14), conductor 1404, and contact 1 and winding of relay O2(16) to battery. Relay O2(16) operates and locks over its contact 2 and conductor 1501 to ground as above traced.

Relay SN—(10), in operating, initiates the operation of the steering circuit, closing a circuit from ground on conductor 1501, contact of relay SN—(10), contact 1 and winding of relay W(10), and resistor WR(10) to battery. Relay W(10) operates in this circuit and locks over its contact 2 and conductor 1011 to ground at contact 5 of relay ON(11). With relay W(10) operated, a circuit is prepared from battery through resistor ZR(10), winding of relay Z(10), and contact 2 of relay W(10) to ground on conductor 1011; but ground supplied by relay SN—(10) is connected over contact 5 of relay Z(10) to resistor ZR(10) in shunt of the winding of relay Z(10) so that relay Z(10) cannot operate until the end of the second pulse period when relay SN—(10) releases.

No pulse is received during the third pulse period and in the fourth pulse period, only a light negative pulse is received causing the operation of relay SN—(10) but ineffective to operate relay MG(10). With relay SN—(10) operated, ground on conductor 1501 is connected over the contact of relay SN—(10) and contact 4 of relay Z(10) to resistor WR(10) in shunt of the winding of relay W(10) causing that relay to release. The release of relay W(10) opens the operating circuit for relay Z(10), but the latter relay remains operated over contact 1 of relay W(10) and the contact of relay SN—(10) until the end of the fourth pulse period when relay SN—(10) releases, in turn releasing relay Z(10).

During each pulse cycle, relays W(10) and Z(10) are normal during the first pulse period, relay W(10) is operated during the second pulse period, both relays W(10) and Z(10) are operated during the third pulse period and relay Z(10) is operated alone during the fourth pulse period. If a light positive pulse is received during the third pulse period of the first digit, the register control circuit would be traced from ground on conductor 1501, contact 1 of relay MG(10), contact 1 of relay SN+(10), contact 3 of relay W(10), conductor 1012, contact 5 of relay ACA(14), conductor 1406, and contact and winding of relay O4(16) to battery. If a heavy negative pulse is received in the fourth pulse period of the first digit, the register control circuit would be traced from ground on conductor 1501, contact 2 of relay SN+(10), contact 2 of relay MG(10), contact 2 of relay Z(10), conductor 1013, contact 7 of relay ACA(14), conductor 1405 to battery through the winding of relay O5(16).

Relay Z(10) controls the operation of a series of distributing or steering relays ACA(14) to H(15). These steering relays function in combination with relays CO(13) and CE(13) in a special form of counting pair, relay CO(13) cooperating with relays ACA(14), ACC(14), B(14), and TH(14) while relay CE(14) cooperates with the alternate relays of the series.

When relay Z(10) operates at the end of the second pulse period of the first digit it closes a circuit from ground on conductor 1011, contact 3 of relay Z(10), conductor 1014, contact 5 of relay H(15), conductor 1502, contact 9 of relay ACA(14), conductor 1407 to battery through the winding of relay CO(13). Relay CO(13) operates in this circuit and closes a locking circuit for itself which may be traced from battery through the winding of relay CO(13), conductor 1407, contact 13, winding and contact 11 of relay ACA(14), contact 17 of relay ACB(14), conductor 1408, and contact 6 of relay CO(13) to ground on conductor 1402. Relay ACA(14) does not operate until relay Z(10) releases at the end of the fourth pulse period of the digit, removing ground from the operating circuit of relay CO(13). When relay ACA(14) operates it closes a locking circuit for itself, independent of relay CO(13), which may be traced from battery through resistor ACAR(14), winding and contact 12 of relay ACA(14) to ground on conductor 1402. At its contact 13, relay ACA(14) opens the locking circuit for relay CO(13) and that relay releases.

When relay Z(10) reoperates at the end of the second pulse period of the second digit, it closes a circuit which extends, as previously traced, to conductor 1502 and thence over contact 10 of relay ACA(14), contact 10 of relay ACB(14), and conductor 1409 to battery through the winding of relay CE(13). Relay CE(13) operates in this circuit and locks in a circuit which may be traced from battery through the winding of relay CE(13), conductor 1409, contact 14, winding, and contact 12 of relay ACB(14), contact 16 of relay ACC(14), conductor 1410, and contact 1 of relay CE(13) to ground on conductor 1402. As in the case of relay ACA(14), relay ACB(14) does not operate until relay Z(10) releases at the end of the digit. Relay ACB(14), when operated, closes a locking circuit for itself from battery through resistor ACBR(14), winding and contact 13 of relay ACB(14) to ground on conductor 1402. At its contact 14 relay ACB(14) opens the locking circuit of relay CE(13) and that relay releases. In a similar manner, relays ACC(14) to H(15) operate at the end of each of the successive digits.

Only two registers are provided, since each digit received from the subscriber sender is sent out by the auxiliary sender during the time that the next digit is being received. As above described, the first digit is registered on the odd register relays O1(16) to O4(16). With relay ACA(14) operated, the registration circuits are extended over front contacts of relay ACA(14) and back contacts of relay ACB(14) to the even register relays E1(16) to E4(16). When relay ACB(14) operates, the registering conductors are transferred back to relays O1(16) to O4(16), and with relay ACC(14) operated, registration again takes place on relays E1(14) to E4(14).

It may be noted that relays CO(13) and CE(13) close supplementary circuits for operating relay O1(16) or relay E1(16) in case the associated steering relay is somewhat slow in operating. The supplementary circuit extends from conductor 1009, which is grounded by relay SN+(10) in the first pulse period, over contact 3 of relay CE(13) and conductor 1300 to the winding of relay O1(16), and over contact 4 of relay CO(13) and conductor 1302 to relay E1(16).

The code pulsing circuit of the above-identified Carpenter patent is arranged to transmit a heavy positive pulse following the last pulse period of the last digit. Since other senders omit this heavy positive pulse, and such a pulse has no function in the auxiliary sender, the pulse receiving relays SN+(10) and MG(10) are wired to absorb a final heavy positive pulse if received. With both relay SN+(10) and relay MG(10) operated, ground from conductor 1501 cannot reach either output conductor. Relay SN—(10) is protected from the heavy positive energization by resistor CR(10) and diode SN(10).

*Multifrequency outpulsing*

As soon as relay AS(10) operates as above described, a circuit is closed from ground on conductor 1108, contact 9 of relay AS(10), conductor 1015, contact 15 of relay ACA(14), and conductor 1411 to battery through the winding of relay KP(13). With relay KP(13) operated, a gate opener signal is transmitted to the distant office by connecting two alternating-current frequencies of the generator 1600 to the outgoing end of the fundamental circuit. It will be remembered that the left winding of repeating coil MFP(10) is connected over the outgoing end of the fundamental circuit to the distant office. A circuit including the right windings of repeating coil MFP(10) may be traced from generator 1600 over conductor 1620, contact 2 of relay KP(13), conductor 1303, upper right winding of repeating coil MFP(13), contact 6 of relay LR(10), lower right winding of repeating coil MFP(13), conductor 1304, contact 1 of relay KP(13), conductor 1612, and back to the generator 1600. The generator 1600 applies a different frequency to each of the conductors 1610, 1611, 1612, 1614, 1617, and 1620 so that the gate opener signal comprises two frequencies. This gate opener signal continues until relay ACA(14) is operated.

Following is a table showing the frequencies used for the various digits as well as for the key pulse or gate opener signal and a start or pulse-end signal.

| Digit | Frequency | | | | | |
|---|---|---|---|---|---|---|
| | 700 | 900 | 1,100 | 1,300 | 1,500 | 1,700 |
| 0 | | | | x | x | |
| 1 | x | x | | | | |
| 2 | x | | x | | | |
| 3 | | x | x | | | |
| 4 | x | | | x | | |
| 5 | | x | | x | | |
| 6 | | | x | x | | |
| 7 | x | | | | x | |
| 8 | | x | | | x | |
| 9 | | | x | | x | |
| Key Pulse | | | x | | | x |
| Start Pulse | | | | x | x | |

With relay ACA(14) operated as a result of the registration of the first digit on relays O1(16) to O4(16), and relay CE(13) operated at the end of the second pulse period of the second digit, one of the relays MF0(16) to MF9(16) is operated in accordance with the digit registered. Since it was previously assumed that the first digit registered was the digit 3, operating relays O1(16) and O2(16), a circuit is now closed from battery through the winding of relay MF3(16), conductor 1603, contact 5 of relay O1(16), contact 3 of relay O2(16), contact 4 of relay O5(16), contact 4 of relay O4(16), conductor 1601, contact 5 of relay SK(11), conductor 1118, contact 2 of relay CE(13), conductor 1305, contact 1 of relay T(15), conductor 1503, contact 4 of relay UNE(13), contact 1 of relay UNO(13), and contact 3 of relay AC(13) to ground on conductor 1101. Relay MF3(16), in operating, connects conductors 1611 and 1612 to conductors 1304 and 1303 respectively.

When relay ON(11) originally operated, a circuit was closed from ground on conductor 1101 to battery through potentiometer PR(13) and resistor R(13). The resulting lower voltage is extended through the windings of polarized relays TS1(13) and TS(13), upper winding of relay TM(13), contact 1 of relay STE(13) to full battery voltage through resistor AP(13). The current in this circuit is in a direction to cause relays TS(13) and TS1(13) to hold their left contacts open and biases relay TM(13) in a direction to close its left contact, but as long as none of the relays MF0(16) to MF9(16) is operated, a circuit is completed from ground on conductor 1101, normally closed contacts on relays MF0(16) to MF9(16), conductor 1602, contact 1 of relay STC(13), conductor 1306, contact 17 of relay H(15), conductor 1504, contact of relay IR(13), resistor I(13), resistor S1(13), varistor TMA(13), and the lower winding of relay TM(13) to resistor AP(13) and battery. This constitutes an inhibitor circuit, since it energizes the lower winding of relay TM(13) in a direction to hold its left contact open and maintains condenser T1(13) discharged. When relay MF3(16) was operated as previously described, this inhibitor circuit was opened and the circuit through the lower winding of relay TM(13) extends from battery through resistor AP(13), lower winding of relay TM(13), varistor TMA(13), resistor S1(13), through condenser T1(13) to ground, and current flow in the lower winding of relay TM(13) continues until condenser T1(13) is charged, to measure a time interval for the transmission of the multifrequency pulse. When the current flow in the lower winding of relay TM(13) dies away, the circuit through the upper winding becomes effective and a circuit is closed from ground on conductor 1101 over the left contact of relay TM(13) through resistor STER(13) and windings of relays TS(13) and TS1(13) to battery through potentiometer PR(13) and resistor R(13). Relays TS1(13) and TS(13) now close their left contacts, but relay TS1(13) performs no useful function at this time. Relay TS(13), in operating, closes a circuit from ground on conductor 1101, left contact of relay TS(13), conductor 1307, contact 1 of relay H(15), conductor 1505, and contact 5 of relay CE(13) to battery through the winding of relay UNO(13). Relay UNO(13) operates and locks over its contact 2, conductor 1310, contact 3 of relay MF3(16), and thence over the normally closed contacts of relays MF2(16), MF1(16), and MF0(16) to ground on conductor 1101. Relay UNO(13), in operating, opens the operating circuit for relay MF3(16) and that relay releases, to reclose the inhibitor circuit and cause relay TM(13) to open its left contact and release relays TS(13) and TS1(13). The operation of relay UNO(13) also opens the locking circuit for relays O1(16) and O2(16) on which the first digit was registered. The release of relay MF3(16) also releases relay UNO(13). When relay UNO(13) operated it also closed a circiut from battery through the winding of relay AC(13) and over contact 3 of relay UNO(13) to ground on conductor 1101. Relay AC(13) operates and locks over its contact 2 and contact 4 of relay CE(13) to ground on conductor 1402. With relay AC(13) operated, the operating circuit of the relays MF0(16) to MF9(16) is held opened until relay CE(13) is released following the reception of the second digit, which has been set up on relays E1(16) to E4(16).

When relay CO(13) is operated during the registration of the third digit, the circuit for operating the multifrequency selecting relay for the second digit extends from ground on conductor 1101 and thence, as previously traced, to conductor 1305, over contact 5 of relay CO(13), conductor 1311, contact 7 of relay H(15), conductor 1506, contact 1 of relay A(14), contact 1 of relay ACB(14), conductor 1412, contact 3 of relay SK(11), conductor 1112 to the lower set of contacts on relays E1(16) to E4(16). Since it was assumed that the digit 1 has been registered, the circuit will extend from conductor 1112 over contact 6 of relay E4(16), contact 8 of relay E5(16), contact 11 of relay E2(16), and contact 10 of relay E1(16) to battery through the winding of relay MF1(16). Relay MF1(16) connects conductors 1610 and 1611 to the out-pulsing conductors 1304 and 1303. As previously described, the operation of relay MF1(16) opens the inhibitor circuit, allowing relay TM(13) to measure off the time for the pulse after which relay TS(13) closes a circuit which extends from ground on conductor 1101 to conductor 1505 and thence over contact 2 of relay CO(13) to battery through the winding of relay UNE(13). Relay UNE(13) operates and locks over its contact 3, conductor 1310, contact 3 of relay MF1(16), and contact 4 of relay MF0(16) to ground on conductor 1101. Relay UNE(13) opens the locking circuit for register relay E1(16), restoring that register to normal, and operates relay AC(13) which locks under the control of relay CO(13) and opens the operating circuit for the multifrequency control relay.

In a similar manner the third, fifth, seventh, and ninth digits are registered on relays O1(16) to O4(16), while the even numbered digits are registered on relays E1(16)

to E4(16), the odd digit being transmitted as a multifrequency signal during the time that the even digit is being received and vice versa. The fourth register of the subscriber sender normally receives the thousands digit and, therefore, transmits that digit in accordance with the special code previously noted. In the case of a 10-digit number, the fourth digit will of course be the first digit of the office code and will be registered on the even register including relays E1(16) to E4(16). During the time that this digit is to be transmitted to the distant office, steering relay A(14) will have been operated and relay CO(13) operated in preparation for recording the fifth digit. Under this condition the operating circuit for the multifrequency select relay, for example relay MF4(16), may be traced from battery through the winding of relay MF4(16), contact 4 of relay E1(16), contact 7 of relay E2(16), contact 3 of relay E5(16), contact 1 of relay E4(16), conductor 1604, contact 1 of relay B(14), contact 2 of relay A(14), conductor 1506, contact 7 of relay H(15), conductor 1311, contact 5 of relay CO(13), conductor 1305, contact 1 of relay T(15), conductor 1503, contact 4 of relay UNE(13), contact 1 of relay UNO(13), and contact 3 of relay AC(13) to ground on conductor 1101. For all other even digits, circuits similar to the one traced for the second digit will be employed.

When the eighth digit, which is the last digit registered in the subscriber sender, has been received and registered on the even register, relay H(15) operates under the control of relay CE(13). With relay H(15) operated, the inhibitor circuit previously used for controlling the operation of relay TM(13) is opened at contact 17 of relay H(15). When this circuit is opened, relay TM(13) operates to close its left contact and, in so doing, connects ground to resistor AP(13) and battery thereby reversing the energization of its upper winding. Condenser T1(13) now discharges through resistor S2(13) and varistor TMB(13) and the lower winding of relay TM(13), thereby delaying the effect of the current reversal, to measure a time interval before relay TM(13) opens its left contact. With this contact open, the original circuit through the windings of relay TM(13) is reclosed, including the charging circuit for condenser T1(13) which now charges to delay the reclosure of the left contact of relay TM(13). Therefore, relay TM(13) continues to pulse freely at a rate determined by the capacity of condenser T1(13) and resistors S1(13) and S2(13). Relays TS(13) and TS1(13) operate in synchronism with relay TM(13) as before. When relay TS(13) operates, it closes a circuit from ground on conductor 1011 over the contact of relay TS(13), conductor 1307, contact 6 of relay H(15), conductor 1502, contact 10 of relay ACA(14), contact 11 of relay ACB(14), contact 10 of relay ACC(14), contact 12 of relay A(14), contact 12 of relay B(14), conductor 1413, contacts 10 of relays C(15), TH(15), and H(15), contact 4 of relay T(14), and conductor 1407 to battery through the winding of relay CO(13). Relay CO(13) locks in a circuit from battery through its winding, conductor 1407, contact 14 of relays ACA(14) and ACC(14), contact 16 of relay B(14), conductor 1414, contact 14 of relay TH(15), contact 8, winding, and contact 6 of relay T(15); contact 10 of relay U(15), contact 15 of relay H(15), contact 15 of relay C(14), conductor 1415, contact 17 of relay A(14), contact 16 of relay ACB(14), conductor 1408, and contact 6 of relay CO(13) to ground on conductor 1402. When relay TS(13) opens its contact, the operating circuit of relay CO(13) is opened and relay T(15) operates in the above-traced locking circuit, in turn locking in a circuit from battery through the resistor TR(13), winding and contact 7 of relay T(15), and conductor 1507 to ground at contact 4 of relay ON(11). Relay T(15), in operating, opens the circuit of relay CO(13) and that relay releases.

With relay T(15) operated, the circuit for operating the multifrequency selection relay, for example relay MF3(16), extends from battery through the winding of relay MF3(16), conductor 1603, contact 5 of relay T2(14), contact 6 of relay T1(14), conductor 1417, contact 1 of relay 7DG(11), conductor 1113, contact 1 of relay U(15), contact 3 of relay T(15), conductor 1508, and contact of relay TS1(13) to ground on conductor 1101. When relay TM(13) opens its contact, relays TS(13) and TS1(13) also open their contacts to terminate the transmission of the ninth digit. Relay CE(13) and relay U(15) operate in a similar manner to control the transmission of the tenth digit, the multifrequency select relay being operated under the control of the units register relays U0(15) to U7(15).

Following the transmission of the tenth digit, the operation of relay TS(13) closes a circuit from ground on conductor 1101, contact of relay TS(13), conductor 1307, and thence, as previously traced, to contact 10 of relay H(15), contact 5 of relay T(15), contact 4 of relay U(15), contact 4 of relay STS(15), and conductor 1407 to battery through the winding of relay CO(13). Relay CO(13) operates and closes a locking circuit for itself which extends, as previously traced, to contact 14 of relay TH(15) and thence over contact 9 of relay T(15), contact 7, winding, and contact 5 of relay STS(15), contact 9 of relay U(15), contact 15 of relay H(15), and thence, as previously traced, to contact 6 of relay CO(13) and ground on conductor 1402. When relay TS(13) opens the operating circuit of relay CO(13), relay STS(15) operates and locks over its contact 6 to ground on conductor 1507. With relay STS(15) operated, a circuit is closed from ground over the front contact of relay TS1(13), at its next cycle, conductor 1508, contact 1 of relay STS(15), and conductor 1509 to battery through the winding of relay STC(13). Relay STC(13) operates and connects conductors 1620 and 1617 to the output circuit to transmit a start signal thereto. At this time, none of the multifrequency select relays are operated and a circuit is closed from battery through the winding of relay STE(13), contact 2 of relay STC(13), and conductor 1602 over the normally closed contacts of the multifrequency select relays MF9(16) to MF0(16) to ground on conductor 1101. Relay STE(13) operates and locks over its contact 2 to ground on conductor 1101, opening the shunt around varistor STE(13). Varistor STE(13) is so poled that it does not interfere with the current cycle of relay TM(13) but does prevent the reenergization of the upper winding of relay TM(13) and so terminates the pulsing. Relay TS1(13) releases a short time later, in turn releasing relay STC(13). When relay STC(13) releases, a circuit is closed from ground on conductor 1101 over the normal contacts of relays MF0(16) to MF9(16), conductor 1602, contact 1 of relay STC(13), contact 3 of relay STE(13), conductor 1308, contact 9 of crosspoint 607, conductor 615, contact 5 of relay SA(15), and conductor 513 to battery through the winding of relay AV1(3). Relay AV1(3) initiates the release of the subscriber sender and the establishment of the talking connection between the subscriber 1000 and toll office MFT(1) in the manner described in the Carpenter patent.

*7-digit call*

Figure 14:
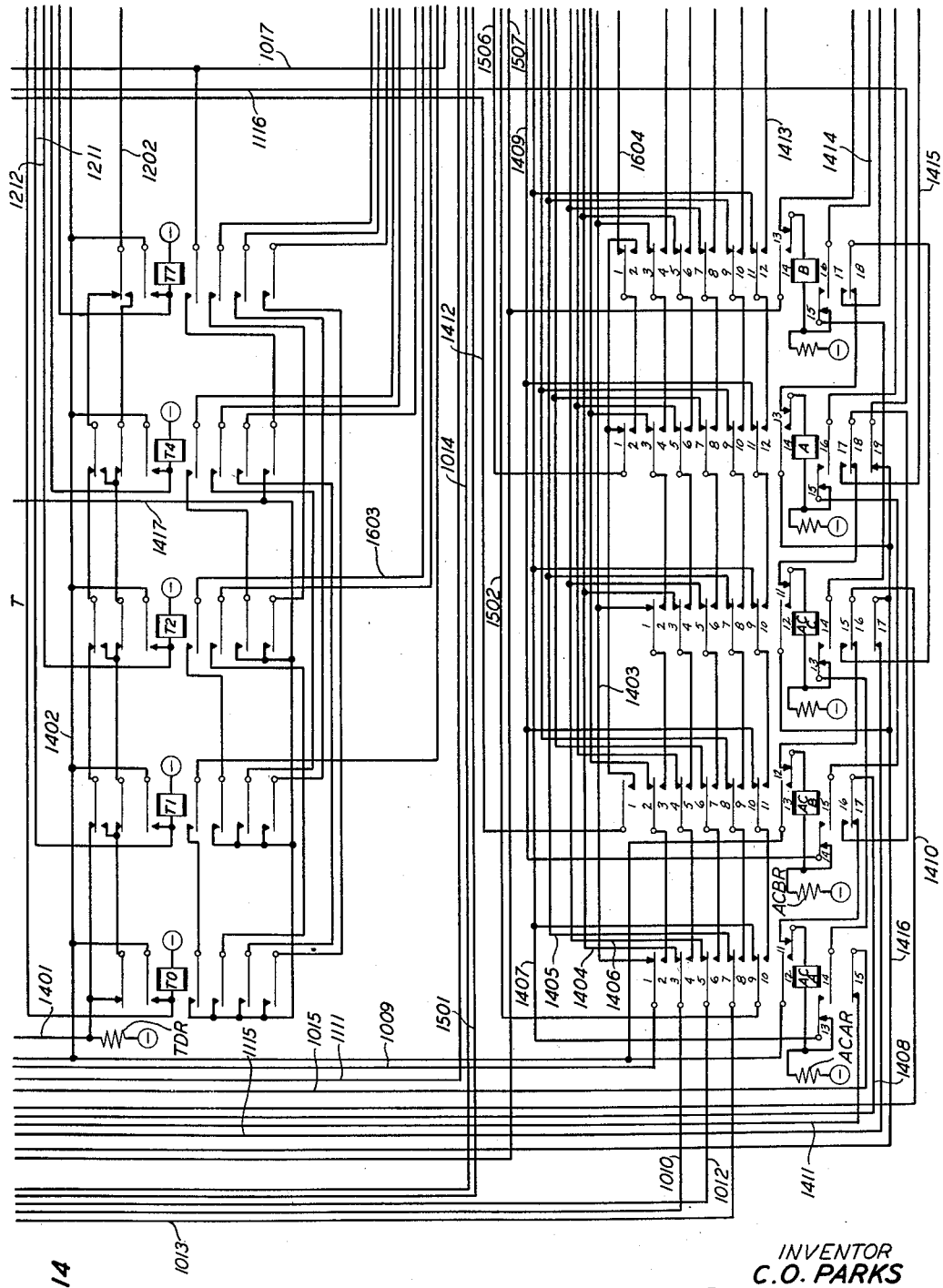

It will be remembered that the auxiliary sender is also used for completing 7-digit calls where it is necessary to transmit the designation to a local office by means of multifrequency pulses. Under this condition the marker operates relay 7DG(5) and relay AS(5) is operated in a circuit from battery through the winding and contact 6 of relay AS(5), contact 2 of relay SA(5), contact 1 of relay DPT(5), and contact 5 of relay 7DG(5) to off-normal ground. As in the previous case, the start circuit for the auxiliary sender connector is closed when a digit has been registered on the units register. When the auxiliary sender has been attached, relay SA(5) operates as previously described. With relay 7DG(5) operated, the operating circuit from relay DPT(5) is opened and that relay is not operated, since the complete designation can be registered in the subscriber sender. Therefore, the pulsing circuit is not extended to the auxiliary sender and no digits are registered on the tens and units registers of Figs. 14 and 15. Relay SC(11) is operated, in turn operating relay ON(11) as before.

As previously described, battery through the winding of relay TGB(10) and ground are connected to the incoming end of the fundamental circuit and relays TGF(10) and OF(10) are connected to the outgoing end of the fundamental circuit as soon as the connection between the subscriber sender and the auxiliary sender is established. When the subscriber sender is ready to make trunk test, relay TGB(10) operates, in turn operating relay TGB1(10) as previously described. Since no digit was registered in the auxiliary sender, relay TD(12) is not operated and a circuit is closed from ground on conductor 1101, contact 1 of relay TD(12), conductor 1206, contact 1 of relay TGB1(11), contact 3 and winding of relay 7DG(11) to battery. Relay 7DG(11) operates in this circuit and locks over its contact 4 to ground on conductor 1111. Relays TGF(10) and OF(10) test the outgoing trunk and function as before to initiate the transmission of the designation registered in the subscriber sender to the auxiliary sender. The registration of the designation and the transmission of seven digits takes place as previously described. Some offices employ 5-digit numbers in which case a digit will be registered on the stations register of the subscriber sender. If a digit is registered, a circuit will be closed from ground over the operated crosspoint of the stations register to conductor 203, contact 10 of relay 7DG(5), conductor 611, contact 5 of crosspoint 607, conductor 1106, contact 1 of relay ON(11), conductor 1205, contact 4 of relay UD(12), conductor 1207, and contact 1 and winding of relay STR(10) to battery. Relay STR(10) operates and locks over its contact 2 to ground on conductor 1111.

If relay STR(10) is not operated, when relay H(15) is operated following the registration of the seventh digit, relay STC(13) is operated in a circuit from battery through the winding of relay STC(13), conductor 1509, contact 5 of relay STR(10), conductor 1016, contact 5 of relay 7DG(11), conductor 1114, contact 3 of relay H(15), conductor 1510, normally closed contacts of register relays E1(16) to E4(16), conductor 1112, contact 3 of relay SK(11), conductor 1412, contact 1 of relay ACB(14), contact 2 of relays B(14) and A(14), conductor 1506, contact 8 of relay H(15), contact 2 of relay T(15), conductor 1508, and contact of relay TS1(13) to ground on conductor 1101. Relay STC(13) transmits the start signal to the distant office in the manner previously described. If relay STR(10) is operated, the digit registered on the stations register will be transmitted and pulsed forward the same as any other digit and relay STC(13) will be operated in a circuit which extends from battery through the winding of relay STC(13), conductor 1509, contact 3 of relay STR(10), conductor 1018, contact 2 of relay 7DG(11), conductor 1113, contact 1 of relay U(15), contact 3 of relay T(15), conductor 1508, and contact of relay TS1(13) to ground on conductor 1101. Otherwise, the completion of the call is the same as previously described.

Skipping digits

It will be remembered that the operating circuit for relay SC(11) extends in series through the windings of relays SK2(11) and SK3(11). These relays serve to control the auxiliary sender to omit or skip certain digits. If the marker determines that two digits should be skipped, it operates relay SK2(5) and that relay operates and locks to conductor 503. Relay SK2(5) is only operated in connection with 7-digit calls so that relay 7DG(5) is also operated. With relays SK2(5) and 7DG(5) operated, ground is connected over contact 2 of relay SK2(5) and contact 7 of relay 7DG(5) through resistor SK1(5), contact 3 of relay SK3(5) and contact 8 of relay SA(5) to conductor 506. The resistance in this ciruit is such that relay SK2(11) operates at the same time as relay SC(11) operates. If the marker determines that three digits are to be skipped, it operates relay SK3(5) which locks to ground on conductor 503. With relay SK3(5) operated, ground is connected over contact 3 of relay SK2(5), contact 2 of relay SK3(5) and contact 8 of relay SA(5) to conductor 506, causing relay SK3(11) to operate as well as relays SC(11) and SK2(11).

With relay SK2(11) operated, a circuit is closed from battery through the winding of relay SK(11), contact of relay SK2(11), conductor 1115, contact 17 of relay ACC(14), conductor 1416 to ground over contact 3 of relay ON(11). Therefore, relay SK(11) remains operated until relay ACC(14) has operated following the registration of the third digit. Similarly, relay SK3(11) closes a circuit for relay SK(11) over its contact and conductor 1116 and contact 19 of relay A(14) to ground on conductor 1416 to hold relay SK(11) operated until the fourth digit has been registered. When relay CE(13) operates, preparatory to registering the even digits, with relay SK(11) operated, a circuit is closed from battery through the winding of relay IR(13), conductor 1309, contact 4 of relay SK(11), conductor 1118, contact 2 of relay CE(13), and thence to ground, operating relay IR(13). With relay IR(13) operated, the inhibitor circuit is removed from relay TM(13) allowing the pulsing relays to perform one cycle in order to unlock the odd register. The circuit for relay IR(13) for the even digit extends over contact 2 of relay SK(11), conductor 1412, contact 1 of relay ACB(14), contact 1 of relay A(14), conductor 1506, contact 7 of relay H(15), conductor 1311, contact 5 of relay CO(13) and thence to ground. Therefore, relay IR(13) serves to alternately release the odd and the even register until relay SK(11) is released, after which the remaining digits are transmitted as registered.

Link timing

If, because of trouble in the link of auxiliary sender, the busy relay AB0(7) should fail to operate, the link circuit would be blocked. Means is therefore provided to release the link circuit when it is blocked in this manner. Whenever a start relay, such as relay ST0(8) is operated, with all of the preference relays AP0(7) to AP9(7) released, a circuit is closed from ground over contact 11 of relay ST0(8), conductor 802, over back contacts of relays AP0(7) to AP9(7), conductor 702, right winding of relay TM(9) to battery. Relay TM(9) operates in this circuit and short circuits its left winding to make itself slow to release. As soon as a preference relay, for example relay AP0(7), operates it opens the circuit of relay TM(9) and that relay releases slowly. Under normal conditions, relay AB0(7) operates and releases relay AP0(7) before relay TM(9) can close its back contact.

If relay AB0(7) does not operate, when relay TM(9) closes its back contact a circuit is closed from battery through the winding of relay LR(9), back contact of relay TM(9), conductor 902 to ground at the contact 6 of relay AP0(7). Relay LR(9) operates and at its contact 2 disconnects battery from conductor 700, thereby opening the locking circuit for relay AP0(7), causing that relay to release. With all of the preference relays released, relay LR(7) also releases. Relay LR(7) at its contact 1 operates an alarm and is made slightly slow to release to insure the operation of the alarm.

Abandoned calls

As fully described in the Carpenter patent, if the calling subscriber abandons the call, relay L(1) releases, in turn releasing relay SR(1) after an interval. Relay ON2(1) is held operated and therefore a circuit is closed from ground on conductor 3615, back contacts of relays L(1) and SR(1), front contact of relay ON2(1), conductor 3113 to battery through the winding of relay LR(1). Relay LR(1) controls the release of the subscriber sender, sender link 103 and district junctor for local calls and for calls employing an auxiliary sender up to the time that the trunk test circuit is closed.

With the auxiliary sender attached to the subscriber sender, a branch of conductor 3113 extends over contact 9 of relay SA(5), conductor 514, contact 7 of crosspoint 607 to conductor 616. When the trunk test circuit is closed by the subscriber sender, relays TGB(10) and relay TGB1(11) are operated as previously described. With relay TGB1(11) operated, conductor 616 is connected over contact 4 of relay TGB(11), conductor 1121, contact 3 and winding of relay LR(10) to battery. Relay LR(10) operates in this circuit and locks over its contact 4 to ground on conductor 1108.

With relay LR(10) operated, the circuit through the right winding of repeating coil MFP(10) is opened so that no more digits will be transmitted to the distant office. If the call has not been accepted at the distant office so that relay AS1(11) is not operated, the operation of relay LR(10) completes a circuit from battery through the winding of relay OF1(10), contact 2 of relay LR(10), contact 6 of relay CTR(10), conductor 1019, contact 8 of relay AS1(11) to ground on conductor 1108. Relay OF1(10) reverses the connection of battery and ground to the trunk test circuit of the subscriber sender thereby causing relay OF(3) to operate as a simulated overflow signal, causing the subscriber sender to be released. In addition, relay LR(10) at its contact 5 opens the trunk test circuit leading to the distant office to permit the distant office to return to normal.

If relay LR(10) is operated after a sender has been attached at the distant office so that relays AS(10) and AS1(11) are operated, relay OF1(10) is not operated and the pulsing circuit, which has been substituted for the trunk test circuit, is not opened. The subscriber sender and the auxiliary sender go through the operations of out-pulsing and release takes place in the usual manner. Since the right winding of repeating coil MFP (10) is opened no multifrequency pulses reach the distant office.

Timing and alarms

In general, if any condition prevents the completion of a call employing an auxiliary sender in the normal interval, an overflow signal will be given to the calling subscriber.

Accordingly, means is provided in the auxiliary sender for timing the various stages of its operation. When off-normal relay ON(11) operates it connects ground over its contact 11, conductor 1101, contact 1 of relay AS1(11), contact 1 of relay RAR(11), conductor 1122 to the armature of interrupter I(10). When interrupter I(10) closes its contact, ground on conductor 1122 is extended over contact 1 and winding of relay TW(10), resistor TWR(10) to battery. Relay TW(10) operates in this circuit and locks over its contact 2 to ground on conductor 1122. At the same time relay TW(10) closes a circuit from battery through resistor TZR(10), winding of relay TZ(10), contact 2 of relay TW(10) to ground on conductor 1122, but ground over the contact of interrupter I(10) is connected over contact 4 of relay TZ(10) to battery through resistor TZR(10) in shunt of the winding of relay TZ(10) so that relay TZ(10) does not operate until interrupter I(10) opens its contact. If ground remains connected to conductor 1122 until interrupter I(10) again closes its contact, ground is connected over contact 5 of relay TZ(10) to battery through resistor TWR(10), in shunt of the winding of relay TW(10) causing that relay to release. Relay TW(10) opens the operating circuit of relay TZ(10) but relay TZ(10) remains operated over contact 1 of relay TW(10) and the contact of interrupter I(10) to ground on conductor 1122.

With relay TW(10) released and relay TZ(10) held operated, a circuit is closed from ground over contact 9 of relay ON(11), conductor 1123, contact 1 of relay TZ(10), contact 4 of relay TW(10) to battery through the winding of relay BK(10). Relay BK(10) operates and locks over its contact 2 to ground on conductor 1108. At the same time a circuit is closed from ground on conductor 1111, contact 3 of relay TW(10), contact 2 of relay TZ(10), contact 3 of relay CTR(10) to battery through the winding of stuck sender meter SS(10) which records the number of times that any sender of the group times out. At its contact 4, relay BK(10) opens the circuit normally used for transmitting the dialing completed signal to the subscriber sender and opens the operating circuit for relay TGF1(11) to prevent starting the distant office. If the condition continues until interrupter I(10) opens its contact, releasing relay TZ(10), a circuit is closed from ground on conductor 1111, contact 3 of relay TW(10), contact 3 of relay TZ(10), contact 1 of relay CTR(10), contact 5 of relay BK(10), conductor 1020, contact 4 of relay AS1(11), contact 5 of relay TGB1(11), conductor 1207, contact 4 of relay UD(12), conductor 1205, contact 1 of relay ON(11), to conductor 1106 as an arbitrary dial completed signal to the subscriber sender to cause the subscriber sender to close the trunk test bridge. Relays TGB(10) and TGB1(11) operate in response to trunk closure, and the circuit above traced from ground to contact 4 of relay AS1(11) now extends over contact 4 of relay TGB1(11), conductor 1123, contact 1 of relay LR(10) to battery through the winding of relay OF1(10) to transmit an overflow signal to the subscriber sender.

When relay RAR(11) operates at the first pulse of the ninth digit, ground is disconnected from conductor 1122 and relays TW(10) and TZ(10) release. Relay RAR(11) releases during the interdigital interval and at the end of the tenth digit to render relays TW(10) and TZ(10) effective between digits and while awaiting response by the distant office.

When the distant office responds and pulsing begins, ground is again connected to conductor 1122 over contact 11 of relay ON(11), conductor 1101, and contact 8 of relay AS(10) to permit relays TW(10) and TZ(10) to time the pulsing.

If relay BK(10) is operated following the operation of relay AS1(11) a circuit is closed when relay TZ(10) releases from ground on conductor 1111, contact 3 of relay TW(10), contact 3 of relay TZ(10), contact 1 of relay CTR(10), contact 5 of relay BK(10), conductor 1020, contact 5 of relay AS1(11), conductor 1509 to battery through the winding of relay STC(13) to transmit a misplaced start pulse, to which the distant office should respond by extending the call to an overflow trunk.

When the interrupter closes its contact for the third time, relay TW(10) reoperates, releasing relay STC(13) which connects ground to conductor 1308 to cause the subscriber sender to restore to normal.

In the foregoing description of the timing operation it has been assumed that relay CTR(10) was not operated. There is a relay like relay CTR(10) in each of the auxiliary senders. In each sender, the operation of relay BK connects the associated relay CTR to a chain circuit extending over back contacts of all of the CTR relays. Assuming that no other CTR relay is operated, when relay BK(10) operated it closed a circuit from ground on the chain circuit over its contact 3, contact 4 and winding of relay CTR(10) to battery, operating relay CTR(10). Relay CTR(10) operates and locks over its contact 5 and contact 2 of relay BK(10) to ground on conductor 1108. At its contact 2, relay CTR(10) opens the ground chain and no other CTR relay can operate. Therefore time out in any other sender proceeds as above described.

With relay CTR(10) operated, the operating circuit for the stuck sender meter SS(10) is opened. In addition, the operation of relay CTR(10) opens the circuit by which the arbitrary dialing completed signal is transmitted to the subscriber sender, by which the displaced start signal is transmitted to the distant office and by which relay OF1(10) is operated so that neither the auxiliary sender nor the subscriber sender can release. The subscriber sender provides the necessary alarms.

What is claimed is:

1. In a telephone system a local office, other offices, switching equipment at said other offices, trunks connecting said local office with said other offices, subscriber senders in said local office, means to set up a control circuit between one of said subscriber senders and one of said other offices including one of said trunks, means in said one subscriber sender for controlling the switching equipment at said other office over said control circuit, auxiliary senders, means to select one of said auxiliary senders, means to set up a control circuit between said one subscriber sender and a different one of said other offices, a relay in said subscriber sender, means responsive to the selection of said auxiliary sender to operate said relay, and contacts controlled by said relay to insert said selected auxiliary sender in said last-mentioned control circuit.

2. In a telephone system an auxiliary sender as set forth in claim 1 having means for receiving designations from said subscriber sender over a part of said control circuit in accordance with one code, means for translating said designations into a different code and means for transmitting said translated designations over a different part of said control circuit to said different office.

3. In a telephone system an auxiliary sender as set forth in claim 1 having means for receiving part of a designation by means of one type of pulsing, means for receiving the remainder of a designation by means of another type of pulsing transmitted over a part of said control circuit, means for translating the entire designation into a third type of pulsing, and means for transmitting the entire translated designation over a different part of said control circuit to said different other office.

4. In a telephone system, a local office, subscriber lines in said local office, other offices, automatic switching equipment at said other offices, trunks connecting said local office with said other offices, subscriber senders in said local office, means to connect one of said subscriber senders with one of said subscriber lines, means in said one subscriber sender operated over said one subscriber line to register the digits of a telephone designation, means responsive to the registration of a telephone designation to establish a control circuit between said one sender and the switching equipment at the other office designated by said registered designation, means normally operated by said subscriber sender to control the switching equipment at said other office over said control circuit, auxiliary senders, means responsive to the registration of a particular designation to select one of said auxiliary senders, a relay in said subscriber sender, means responsive to the selection of said one auxiliary sender to operate said relay, contacts controlled by said relay to insert said auxiliary sender in said control circuit, and means responsive to the insertion of said auxiliary sender in said control circuit to render said auxiliary sender effective to control the switching equipment at the other office designated by said particular designation.

5. In a telephone system, a local office, subscriber lines in said local office, other offices, automatic switching equipment at said other offices, trunks connecting said local office with said other offices, subscriber senders in said local office, means to connect one of said subscriber senders with one of said subscriber lines, means in said one subscriber sender operated over said one subscriber line to register the digits of a telephone designation, means responsive to the registration of a telephone designation to establish a control circuit between said one sender and the switching equipment at the other office designated by said registered designation, means normally operated by said subscriber sender to control the switching equipment at said other office over said control circuit, auxiliary senders, means responsive to the registration of a particular digit value as a part of a different designation to select one of said auxiliary senders, a relay in said subscriber sender, means responsive to the selection of said one auxiliary sender to operate said relay, contacts controlled by said relay to insert said auxiliary sender in said control circuit, and means responsive to the insertion of said auxiliary sender in said control circuit to render said auxiliary sender effective to control the switching equipment at the other office designated by said different designation.

6. In a telephone system, a local office, subscriber lines in said local office, other offices, automatic switching equipment at said other offices, trunks connecting said local office with said other offices, subscriber senders in said local office, means to connect one of said subscriber senders with one of said subscriber lines, means in said one subscriber sender operated over said one subscriber line to register the digits of a telephone designation, means responsive to the registration of a telephone designation to establish a control circuit between said one sender and the switching equipment at the other office designated by said registered designation, means normally operated by said subscriber sender to control the switching equipment at said other office over said control circuit, auxiliary senders, first means responsive to the registration of a particular designation, other means responsive to the registration of a particular digit value as a part of a different designation, means to select one of said auxiliary senders said selecting means operable by said first responsive means or by said other responsive means, a relay in said subscriber sender, means responsive to the operation of said selecting means to operate said relay, contacts controlled by said relay to insert said selected auxiliary sender in said control circuit, and means responsive to the insertion of said auxiliary sender in said control circuit to render said auxiliary sender effective to control the switching equipment at said other offices.

7. In a telephone system, a local office, subscriber lines in said local office, other offices, automatic switching equipment at said other offices, trunks connecting said local office with said other offices, subscriber senders in said local office, means to connect one of said subscriber senders with one of said subscriber lines, means in said one subscriber sender operated over one of said subscriber lines to register the digits of a telephone designation, means responsive to the registration of a telephone designation to establish a control circuit between said one sender and the switching equipment at the other office designated by said registered designation, auxiliary senders, means responsive to the registration of a particular digit value as a part of a designation to connect one of said auxiliary senders with said subscriber sender, means effective responsive to the connection of said auxiliary sender with said subscriber sender to register additional digits of said designation in said auxiliary sender under the control of said calling subscriber line, means to transmit the digits registered in the subscriber sender to said auxiliary sender, and means in said auxiliary sender to transmit all of the digits registered therein to said distant office.

8. In a telephone system, a local office, subscriber lines in said local office, other offices, automatic switching equipment at said other offices, trunks connecting said local office with said other offices, subscriber senders in said local office, means to connect one of said subscriber senders with one of said subscriber lines, means in said one subscriber sender operated over one of said subscriber lines to register the digits of a telephone designation, means responsive to the registration of a telephone designation to establish a control circuit between said one sender and the switching equipment at the other office designated by said registered designation, auxiliary senders, first means responsive to the registration of a particular designation, other means responsive to the registration of a particular digit value as a part of a different designation, means to connect one of said auxiliary senders with said subscriber sender, said connecting means operable by said first responsive means or by said other responsive means, means under the control of said other responsive means to register additional digits of said designation in said auxiliary sender under the control of said calling subscriber line, means under the control of said first responsive means or of said other responsive means to transmit the digits registered in the subscriber sender to said auxiliary sender, and means in said auxiliary sender to transmit all of the digits registered therein to said distant office.

9. In a telephone system, a local office, subscriber lines in said local office, other offices, automatic switching equipment at said other offices, trunks connecting said local office with said other offices, subscriber senders in said local office, means to connect one of said subscriber senders with one of said subscriber lines, means in said one subscriber sender operated over one of said subscriber lines to register the digits of a telephone designation, means responsive to the registration of a telephone designation to establish a control circuit between said one sender and the switching equipment at the other office designated by said registered designation, auxiliary senders, first means responsive to the registration of a particular designation, other means responsive to the registration of a particular digit value as a part of a different designation, means to connect one of said auxiliary senders with said subscriber sender, said connecting means operable by said first responsive means or by said other responsive means, means under the control of said other responsive means to register additional digits of said designation in said auxiliary sender under the control of said calling subscriber line, means under the control of said first responsive means or of said other responsive means to transmit the digits registered in the subscriber sender to said auxiliary sender, means in said auxiliary sender to transmit all of the digits registered therein to said distant office, and means under the control of said first responsive means to prevent the registration of additional digits in said auxiliary sender.

10. In a telephone system an auxiliary sender as set forth in claim 9 in which the transmission of said registered digits to said other office is controlled by digit registers in said auxiliary sender, including means for receiving digits by means of two types of pulsing, and means for determining whether one or both of said receiving means shall be used.

11. In a telephone system an auxiliary sender as set forth in claim 9 in which the transmission of said registered digits to said other office is determined by digit registers in said auxiliary sender, including means for receiving digits by means of one type of pulsing, means for receiving other digits by means of a second type of pulsing, and means for determining whether one or both of said receiving means shall be used, according as said auxiliary sender connecting means is operated under the control of said first responsive means or is operated under the control of said other responsive means.

References Cited in the file of this patent
UNITED STATES PATENTS

| | | |
|---|---|---|
| 2,283,395 | Strickler | May 19, 1942 |
| 2,564,441 | McKim et al. | Aug. 14, 1951 |
| 2,678,353 | Ostline | May 11, 1954 |